US010616573B2

(12) United States Patent
Ugur et al.

(10) Patent No.: US 10,616,573 B2
(45) Date of Patent: Apr. 7, 2020

(54) METHOD AND APPARATUS FOR VIDEO CODING AND DECODING

(71) Applicant: Nokia Technologies Oy, Espoo (FI)

(72) Inventors: Kemal Ugur, Istanbul (TR); Miska Matias Hannuksela, Tampere (FI); Jani Lainema, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/149,322

(22) Filed: Jan. 7, 2014

(65) Prior Publication Data

US 2014/0219346 A1    Aug. 7, 2014

Related U.S. Application Data

(60) Provisional application No. 61/749,530, filed on Jan. 7, 2013.

(51) Int. Cl.
  *H04N 19/105*    (2014.01)
  *H04N 19/46*    (2014.01)
  (Continued)

(52) U.S. Cl.
  CPC .......... *H04N 19/105* (2014.11); *H04N 19/33* (2014.11); *H04N 19/46* (2014.11); *H04N 19/573* (2014.11);
  (Continued)

(58) Field of Classification Search
  CPC ................ H04N 19/503; H04N 19/00575
  (Continued)

(56) References Cited

U.S. PATENT DOCUMENTS 7,643,560 B2 * 1/2010 Hong ................... H04N 21/242
                                                           375/240.25
7,751,473 B2   7/2010 Hannuksela
(Continued)

FOREIGN PATENT DOCUMENTS

CA          2824027        7/2012
WO    2008/084443 A1      7/2008
(Continued)

OTHER PUBLICATIONS

Boyce, J., Y.K. Wang, "NAL unit header and parameter set designs for HEVC extensions", Joint Collaborative Team on Video Coding (JCT-VC) of ITU-T SG 16 WP 3 and ISO/IEC JTC 1/SC 29/WG 11, 11th Meeting: Shangai, CN, Oct. 10-19, 2012.*
(Continued)

*Primary Examiner* — Richard A Hansell, Jr.
(74) *Attorney, Agent, or Firm* — Alston & Bird LLP

(57) ABSTRACT

Various methods, apparatuses and computer program products for video encoding and decoding. In some embodiments a first picture having a first resolution on a first layer is encoded without inter-layer prediction; a second picture having a second resolution on a second layer is encoded without inter-layer prediction; a third picture having the second resolution on the second layer is encoded without inter-layer prediction and without temporally referencing to pictures prior to the second picture. Further, a corresponding indication is encoded. In some embodiments one or more indications are received to determine if a switching point, referring to a picture coded using inter-layer prediction, from the first layer to the second layer exists, and if so, pictures in the first layer prior to the switching point; pictures associated with the switching point; and pictures in the second layer after the switching point may be decoded.

18 Claims, 13 Drawing Sheets

(51) Int. Cl.
  *H04N 19/33* (2014.01)
  *H04N 19/58* (2014.01)
  *H04N 19/573* (2014.01)
  *H04N 19/70* (2014.01)
  *H04N 19/96* (2014.01)
  *H04N 19/187* (2014.01)
  *H04N 19/11* (2014.01)
  *H04N 19/103* (2014.01)
  *H04N 19/19* (2014.01)

(52) U.S. Cl.
  CPC ............ *H04N 19/58* (2014.11); *H04N 19/70* (2014.11); *H04N 19/103* (2014.11); *H04N 19/11* (2014.11); *H04N 19/187* (2014.11); *H04N 19/19* (2014.11); *H04N 19/96* (2014.11)

(58) Field of Classification Search
  USPC .................................................. 375/240.12
  See application file for complete search history.

(56) References Cited

U.S. PATENT DOCUMENTS

| | | | |
|---|---|---|---|
| 7,986,731 B2 | 7/2011 | Haskell et al. | |
| 8,144,764 B2 | 3/2012 | Hannuksela | |
| 9,723,321 B2* | 8/2017 | Choi | H04N 19/597 |
| 2006/0268169 A1* | 11/2006 | Han | H04N 7/0125 348/458 |
| 2007/0110150 A1* | 5/2007 | Wang | H04N 21/23432 375/240.1 |
| 2007/0263087 A1* | 11/2007 | Hong | H04N 7/152 348/14.13 |
| 2008/0304566 A1* | 12/2008 | Yoon | H04N 19/105 375/240.12 |
| 2009/0161762 A1 | 6/2009 | Jun et al. | |
| 2009/0320081 A1* | 12/2009 | Chui | H04N 7/17318 725/93 |
| 2011/0150084 A1 | 6/2011 | Choi et al. | |
| 2012/0183076 A1* | 7/2012 | Boyce | H04N 19/105 375/240.25 |
| 2013/0182774 A1* | 7/2013 | Wang | H04N 19/46 375/240.24 |
| 2013/0208792 A1* | 8/2013 | He | H04N 19/105 375/240.12 |
| 2014/0092964 A1* | 4/2014 | Ugur | H04N 19/46 375/240.12 |
| 2014/0192865 A1* | 7/2014 | Zhang | H04N 19/105 375/240.12 |

FOREIGN PATENT DOCUMENTS

| | | | | |
|---|---|---|---|---|
| WO | WO 2008084443 A1 * | 7/2008 | ........... | H04N 19/597 |
| WO | WO-2008084443 A1 * | 7/2008 | | |
| WO | 2014/049205 A1 | 4/2014 | | |
| WO | WO 2014047877 A1 * | 4/2014 | ............. | H04N 19/30 |
| WO | WO-2014047877 A1 * | 4/2014 | | |

OTHER PUBLICATIONS

Wang Y-K and Hannuksela M. "Enhancement-layer IDR (EIDR) picture" Joint Video Team (JVT) of ISO/IEC MPEG & ITU-T VCEG 17th Meeting: Nice, France, Oct. 14-21, 2005 (this document was previously identified in the IDS dated Aug. 5, 2016 and is therefore not provided) (Year: 2005).*

Wang Y-K and Hannuksela M. "Enhancement-layer IDR (EIDR) picture" Joint Video Team (JVT) of ISO/IEC MPEG & ITU-T VCEG 17th Meeting: Nice, France, Oct. 14-21, 2005 (this document was previously identified in the IDS dated Aug. 5, 2016 and is therefore not provided) (Year: 2005) (Year: 2005).*

Boyce, J., Y.K. Wang, "NAL unit header and parameter set designs for HEVC extensions", Joint Collaborative Team on Video Coding (JCT-VC) of ITU-T SG 16 WP 3 and ISO/I EC JTC 1/SC 29/WG 11, 11th Meeting: Shangai, CN, Oct. 10-19, 2012 (Year: 2012).*

Wang Y-K and Hannuksela M. "Enhancement-layer IDR (EIDR) picture" Joint Video Team (JVT) of ISO/IEC MPEG & ITU-T VCEG 17th Meeting: Nice, France, Oct. 14-21, 2005 (this document was previously identified in the IDS dated Aug. 5, 2016 and is therefore not provided) (Year: 2005).*

Boyce, J., Y.K. Wang, "NAL unit header and parameter set designs for HEVC extensions", Joint Collaborative Team on Video Coding (JCT-VC) of ITU-T SG 16 WP 3 and ISO/I EC JTC 1/SC29/WG 11, 11th Meeting: Shangai, ON, Oct. 10-19, 2012 (Year: 2012).*

Bross et al., "High Efficiency Video Coding (HEVC) Text Specification Draft 7", Joint Collaborative Team on Video Coding (JCT-VC) of ITU-T SG16 WP3 and ISO/IEC JTC1/SC29/WG11, 9th Meeting, Apr. 27-May 7, 2012, 297 pages.

Davies, "Resolution Switching for Coding Efficiency and Resilience", Joint Collaborative Team on Video Coding (JCT-VC) of ITU-T SG16 WP3 and ISO/IEC JTC1/SC29/WG11, 6th Meeting, Jul. 14-22, 2011, pp. 1-11.

Boyce et al., "NAL Unit Header and Parameter Set Designs for HEVC Extensions", Joint Collaborative Team on Video Coding (JCT-VC) of ITU-T SG 16 WP 3 and ISO/IEC JTC 1/SC 29/WG 11, 11th Meeting, Oct. 10-19, 2012, pp. 1-8.

Boyce et al., "High Level Syntax Hooks for Future Extensions", Joint Collaborative Team on Video Coding (JCT-VC) of ITU-T SG16 WP3 and ISO/IEC JTC1/SC29/WG11, 8th Meeting, Feb. 1-10, 2012, pp. 1-6.

Coban et al., "Support of Independent Sub-Pictures", Joint Collaborative Team on Video Coding (JCT-VC) of ITU-T SG16 WP3 and ISO/IEC JTC1/SC29/WG11, 9th Meeting, Apr. 27-May 7, 2012, pp. 1-5.

International Search Report and Written Opinion received for corresponding Patent Cooperation Treaty Application No. PCT/FI2014/050007, dated Apr. 22, 2014, 12 pages.

Sodagar, "The MPEG-DASH Standard for Multimedia Streaming Over the Internet", IEEE MultiMedia, vol. 18, Issue 4, Apr. 2011, pp. 62-67.

Ugur et al., "AHG9: Using SHVC for Adaptive Resolution Change and Efficient Trick Mode", Joint Collaborative Team on Video Coding (JCT-VC) of ITU-T SG 16 WP 3 and ISO/IEC JTC 1/SC 29/WG 11, 13th Meeting, Apr. 18-26, 2013, pp. 1-5.

Fielding et al., "Hypertext Transfer Protocol—HTTP/1.1", Network Working Group, RFC 2616, Jun. 1999, pp. 1-114.

Farber et al., "Adaptive Progressive Download Based on the MPEG-4 File Format", Journal of Zhejiang University Science A, vol. 7, Issue 1 Supplement, Jan. 2006, pp. 106-111.

Zambelli, "IIS Smooth Streaming Technical Overview", Microsoft Corporation, Mar. 31, 2009, pp. 1-17.

Pantos et al., "HTTP Live Streaming", Informational Internet-Draft, Apple Inc., Sep. 22, 2012, pp. 1-37.

"HTTP Dynamic Streaming on the Adobe Flash Platform", Enabling high-quality, network-efficient HTTP streaming for media delivery, Adobe Flash Platform, Technical White Paper, 2010, pp. 1-18.

"3rd Generation Partnership Project; Technical Specification Group Services and System Aspects; Transparent End-to-End Packet-Switched Streaming Service (PSS); Protocols and Codecs (Release 9)", 3GPP TS 26.234, V9.10.0, Jun. 2013, pp. 1-189.

"3rd Generation Partnership Project; Technical Specification Group Services and System Aspects; Transparent End-to-End Packet-Switched Streaming Service (PSS); Progressive Download and Dynamic Adaptive Streaming Over HTTP (3GP-DASH) (Release 10)", 3GPP TS 26.247, V10.6.0, Dec. 2013, pp. 1-113.

Office action received for corresponding Vietnamese Patent Application No. 1-2015-02820, dated Sep. 10, 2015, 1 page of office action and 1 page of office action translation available.

Hoda, R. et al. "Efficient Video Resolution Adaptation Using Scalable H.265/HEVC." 2013 IEEE International Conference on Image Processing, Sep. 15, 2013, pp. 1563-1567.

Lee, B. et al. "SVC NAL Unit Types for Online Extraction." 21st JVT Meeting: 78. MPEG Meeting; Oct. 20-27, 2006; Hangzhou, China (Joint Video Team of ISO/IEC JTC1/SC29/WG11 and ITU-T SG. 16), No. JVT-U080, Oct. 22, 2006, XP030006726.

(56) References Cited

OTHER PUBLICATIONS

Seregin, V. et al. "SHVC HLS: On Adaptive Resolution Change Based on Single-Layer for Non-Irap Flag." 15th JCT-VC Meeting; Oct. 23-Nov. 1, 2013; Geneva; (Joint Collaborative Team on Video Coding of ISO/IEC JTC1/SC29/WG11 and ITU-T SG.16); URL: <http://wftp3.itu.int/av-arch/jctvc-site/>, No. JCTVC-O0251, Oct. 15, 2013.

Shen, Q. et al. "Joint Video Team (JVT) of ISO/IEC MPEG & ITU-T VCEG (ISO/IEC JTC1/SC29/WG11 and ITU", Jan. 1, 2006, pp. 14-20, XP055271460.

Ugur, K. et al. "Adaptive Resolution Change with SHVC." 12th JCT-VC Meeting; 103rd MPG Meeting; Jan. 14-Jan. 23, 2013; Geneva (Joint Collaborative Team On Video Coding of ISO/IEC JTC1/SC29/WG11 and ITU-T SG.16); URL: <http://wftp3.itu.int/av-arch/jctvc-site/>, No. JCTVC-L0119, Jan. 7, 2013.

Wang, Y-K. et al. "Enhancement-Layer IDR picture (EIDR)." 17th JVT Meeting; 74. MPEG Meeting; Oct. 14, 2005-Oct. 21, 2005; Nice, France; (Joint Video Team of ISO/IEC JTC1/SC29/WG11 and ITU-T SG.16), No. JVT-Q065, Oct. 11, 2005, XP030006226.

Extended European Search Report for EP Application No. 14735401.3 dated Jun. 15, 2016, 8 pages.

Office Action received for corresponding Canadian Patent Application No. 2,897,152, dated Sep. 9, 2016, 6 pages.

Office Action for Korean Application No. 10-2015-7021117 dated Nov. 29, 2016.

Office Action for Korean Application No. 10-2015-7021117 dated Jul. 11, 2017, with English translation, 3 pages.

Office Action for Canadian Application No. 2,897,152 dated Jul. 28, 2017, 5 pages.

Office Action and Search Report for Chinese Patent Application No. 2014800128130 dated Aug. 2, 2017 with English Summary, 10 pages.

Office Action for Japanese Application No. 2015-551212 dated Oct. 4, 2016.

Jie Jia, H-W K. et al., *SP-Picture for SVC*, Joint Video Team (JVT) of ISO/IEC MPEG & ITU-T VCEG (ISO/IEC JTC1SC29/WG11 and ITU-T SG16 Q.6), JVT-T022 (Mar. 31-Apr. 7, 2006) 23 pages.

Lee, Bumshik et al., *Extension of SVC NAL Types for Online Extraction of SVC Bitstreams*, Joint Video Team (JVT) of ISO/IEC MPEG & ITU-T VCEG (ISO/IEC JTC1SC29/WG11 and ITU-T SG16 Q.6), JVT-U080 (Oct. 20-27, 2006) 8 pages.

Office Action for Japanese Application No. 2015-551212 dated May 30, 2017, with English translation, 2 pages.

Office Action for Indian Application No. 4728/CHENP/2015 dated Jul. 31, 2019.

Office Action for European Application No. 14735401.3 dated Aug. 1, 2019.

"Advanced video coding for generic audiovisiual services" ITU-T H.264, dated Jan. 2012.

"Video coding for low bit rate communication" ITU-T Rec. H.263, dated Jan. 2005.

\* cited by examiner

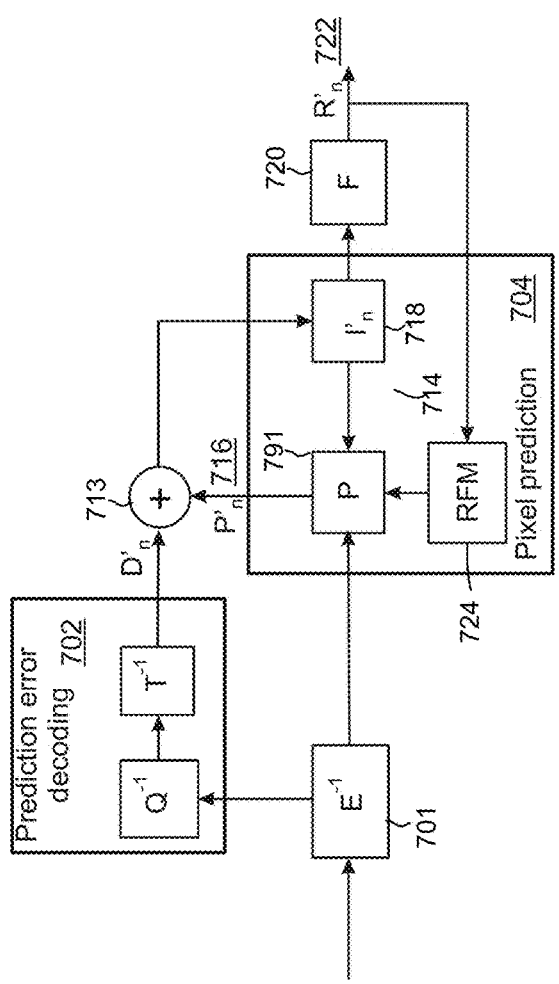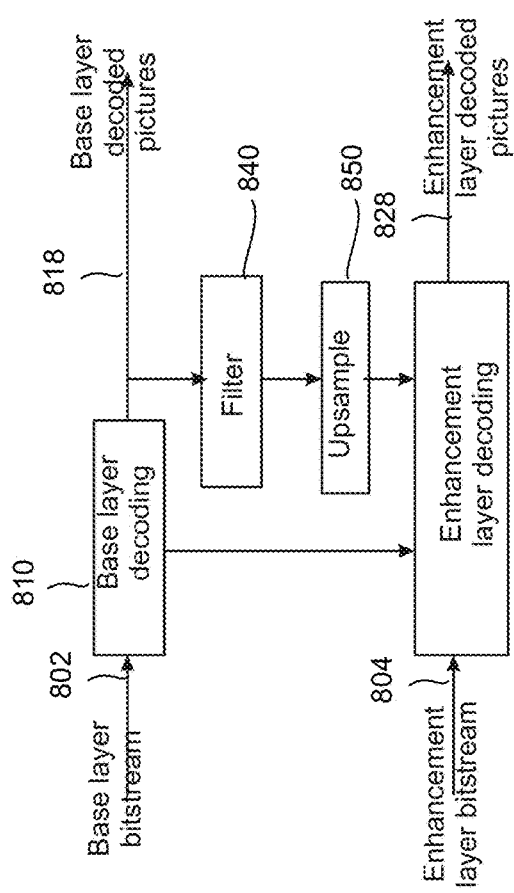

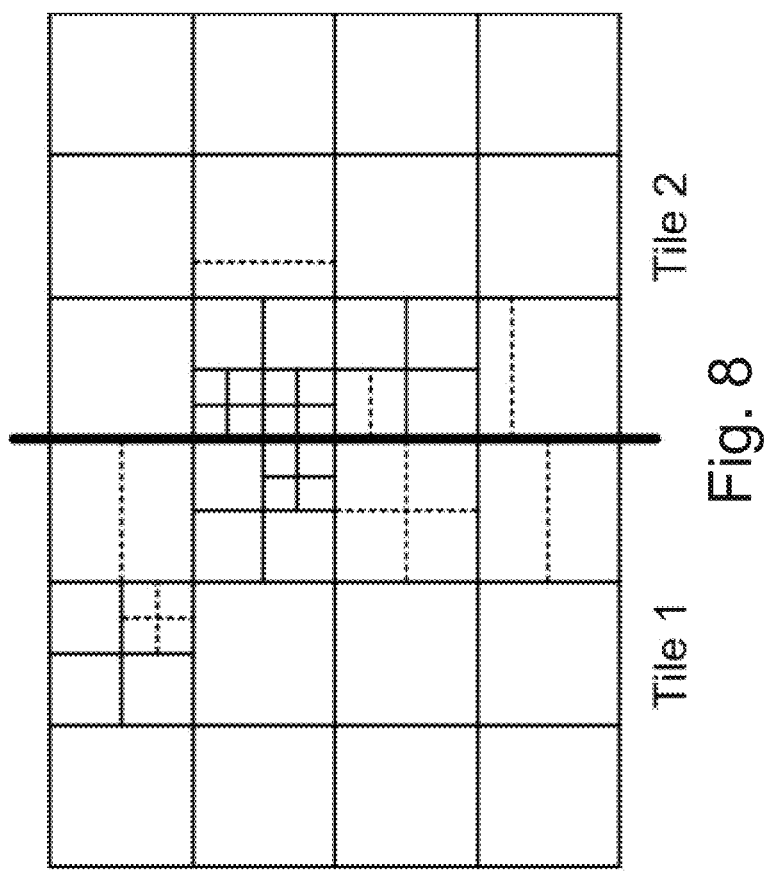

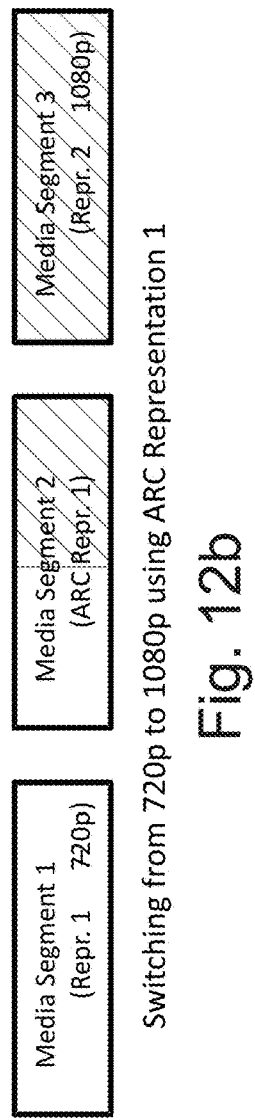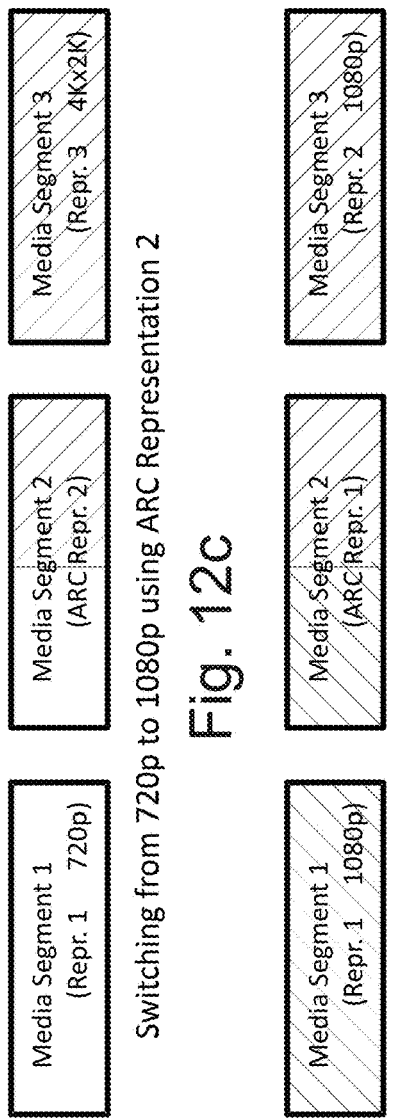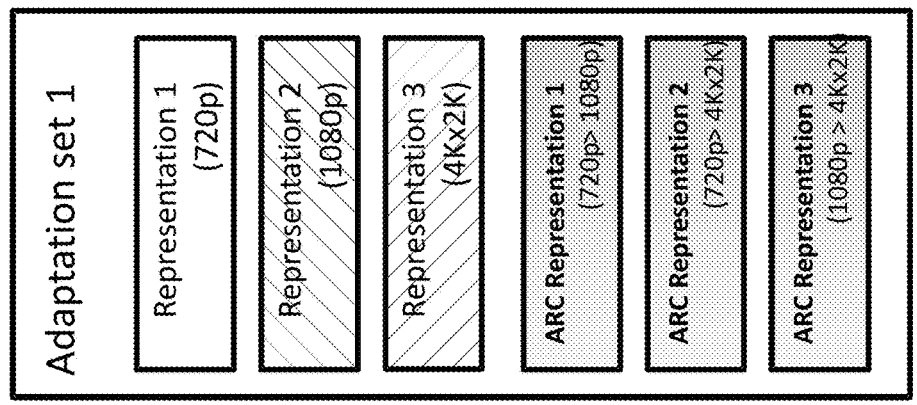

METHOD AND APPARATUS FOR VIDEO CODING AND DECODING

TECHNICAL FIELD

The present application relates generally to an apparatus, a method and a computer program for video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Scalable video coding refers to a coding structure where one bitstream can contain multiple representations of the content at different bitrates, resolutions, frame rates and/or other types of scalability. A scalable bitstream may consist of a base layer providing the lowest quality video available and one or more enhancement layers that enhance the video quality when received and decoded together with the lower layers. In order to improve coding efficiency for the enhancement layers, the coded representation of that layer may depend on the lower layers. Each layer together with all its dependent layers is one representation of the video signal at a certain spatial resolution, temporal resolution, quality level, and/or operation point of other types of scalability.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

In the encoding of 3D video content, video compression systems, such as Advanced Video Coding standard H.264/AVC or the Multiview Video Coding MVC extension of H.264/AVC can be used.

SUMMARY

Some embodiments provide a method for encoding and decoding video information. In some embodiments an aim is to enable adaptive resolution change using a scalable video coding extension, such as SHVC. This may be done by indicating in the scalable video coding bitstream that only certain type of pictures (e.g. RAP pictures, or a different type of pictures indicated with a different NAL unit type) in the enhancement layer utilize inter-layer prediction. In addition, the adaptive resolution change operation may be indicated in the bitstream so that, except for switching pictures, each access unit (AU) in the sequence contains a single picture from a single layer (which may or may not be a base-layer picture); and access units where switching happens include pictures from two layers and inter-layer scalability tools may be used.

The aforementioned coding configuration may provide some advances. For example, using this indication, adaptive resolution change may be used in a video-conferencing environment with the scalable extension framework; and a middle box may have more flexibility to trim the bitstream and adapt for end-points with different capabilities.

Various aspects of examples of the invention are provided in the detailed description.

According to a first aspect, there is provided a method comprising:

encoding a first picture having a first resolution on a first layer without using inter-layer prediction;

encoding a second picture having a second resolution on a second layer using inter-layer prediction between the first layer and the second layer and without using temporal prediction using pictures from the second layer for providing a switching point from the first layer to the second layer;

encoding a third picture having the second resolution on the second layer without using inter-layer prediction and without temporally referencing to pictures prior to the second picture on the second layer; and encoding an indication that the first and third pictures are encoded without using inter-layer prediction and that the second picture is encoded using inter-layer prediction but without using temporal prediction.

According to a second aspect of the present invention, there is provided an apparatus comprising at least one processor and at least one memory including computer program code, the at least one memory and the computer program code configured to, with the at least one processor, cause the apparatus to:

encode a first picture having a first resolution on a first layer without using inter-layer prediction;

encode a second picture having a second resolution on a second layer using inter-layer prediction between the first layer and the second layer and without using temporal prediction using pictures from the second layer for providing a switching point from the first layer to the second layer;

encode a third picture having the second resolution on the second layer without using inter-layer prediction and without temporally referencing to pictures prior to the second picture on the second layer; and encode an indication that the first and third pictures are encoded without using inter-layer prediction and that the second picture is encoded using inter-layer prediction but without using temporal prediction.

According to a third aspect of the present invention, there is provided a computer program product embodied on a non-transitory computer readable medium, comprising computer program code configured to, when executed on at least one processor, cause an apparatus or a system to:

encode a first picture having a first resolution on a first layer without using inter-layer prediction;

encode a second picture having a second resolution on a second layer using inter-layer prediction between the first layer and the second layer and without using temporal prediction using pictures from the second layer for providing a switching point from the first resolution to the second resolution;

encode a third picture having the second resolution on the second layer without using inter-layer prediction and without temporally referencing to pictures prior to the second picture on the second layer; and encode an indication that the first and third pictures are encoded without using inter-layer prediction and that the second picture is encoded using inter-layer prediction but without using temporal prediction.

According to a fourth aspect of the present invention, there is provided an apparatus comprising:

means for encoding a first picture having a first resolution on a first layer without using inter-layer prediction;

means for encoding a second picture having a second resolution on a second layer using inter-layer prediction between the first layer and the second layer and without using temporal prediction using pictures from the second layer for providing a switching point from the first layer to the second layer;

means for encoding a third picture having the second resolution on the second layer without using inter-layer prediction and without temporally referencing to pictures prior to the second picture on the second layer; and means for encoding an indication that the first and third pictures are encoded without using inter-layer prediction and that the second picture is encoded using inter-layer prediction but without using temporal prediction.

According to a fifth aspect of the present invention, there is provided a method comprising:

receiving one or more indications to determine if inter-layer prediction has been used in encoding of random access point pictures and if a switching point from a first layer to a second layer exists in a bit stream, wherein if the switching point exists and if the switching point refers to a picture coded using inter-layer prediction, the method further comprises:

decoding one or more pictures in the first layer prior to the switching point;

decoding one or more pictures associated with the switching point; and decoding one or more pictures in the second layer after the switching point.

According to a sixth aspect of the present invention, there is provided an apparatus comprising at least one processor and at least one memory including computer program code, the at least one memory and the computer program code configured to, with the at least one processor, cause the apparatus to:

receive one or more indications to determine if a switching point from a first layer to a second layer exists in a bit stream, wherein said at least one memory stored with code thereon, which when executed by said at least one processor, causes the apparatus to perform at least the following, if the switching point exists and if the switching point refers to a picture coded using inter-layer prediction:

decode one or more pictures in the first layer prior to the switching point;

decode one or more pictures associated with the switching point; and decode one or more pictures in the second layer after the switching point.

According to a seventh aspect of the present invention, there is provided a computer program product embodied on a non-transitory computer readable medium, comprising computer program code configured to, when executed on at least one processor, cause an apparatus or a system to:

receive one or more indications to determine if a switching point from a first layer to a second layer exists in a bit stream, wherein said at least one memory stored with code thereon, which when executed by said at least one processor, causes the apparatus to perform at least the following, if the switching point exists and if the switching point refers to a picture coded using inter-layer prediction:

decode one or more pictures in the first layer prior to the switching point;

decode one or more pictures associated with the switching point; and decode one or more pictures in the second layer after the switching point.

According to an eighth aspect of the present invention, there is provided an apparatus comprising:

means for receiving one or more indications to determine if a switching point from a first layer to a second layer exists in a bit stream;

means for decoding one or more pictures in the first layer prior to the switching point, for decoding one or more pictures associated with the switching point, and for decoding one or more pictures in the second layer after the switching point, if the switching point exists and if the switching point refers to a picture coded using inter-layer prediction.

According to a ninth aspect, there is provided a method comprising:

encoding a first set of pictures having a first resolution into a first representation;

encoding a second set of pictures into a second representation using inter prediction from the first set of pictures and without using temporal prediction for providing a switching point from the first resolution to a second resolution;

encoding a third set of pictures having the second resolution into a third representation without using inter-layer prediction and without temporally referencing to pictures prior to the second set of pictures of the second representation; and encoding an indication that the first and third set of pictures are encoded without using inter-layer prediction and that at least one picture of the second set of pictures is encoded using inter-layer prediction but without using temporal prediction.

According to a tenth aspect, there is provided an apparatus comprising at least one processor and at least one memory including computer program code, the at least one memory and the computer program code configured to, with the at least one processor, cause the apparatus to:

encode a first set of pictures having a first resolution into a first representation;

encode a second set of pictures into a second representation using inter prediction from the first set of pictures and without using temporal prediction for providing a switching point from the first resolution to a second resolution;

encode a third set of pictures having the second resolution into a third representation without using inter-layer prediction and without temporally referencing to pictures prior to the second set of pictures of the second representation; and encode an indication that the first and third set of pictures are encoded without using inter-layer prediction and that at least one picture of the second set of pictures is encoded using inter-layer prediction but without using temporal prediction.

According to an eleventh aspect, there is provided a computer program product embodied on a non-transitory computer readable medium, comprising computer program code configured to, when executed on at least one processor, cause an apparatus or a system to:

encode a first set of pictures having a first resolution into a first representation;

encode a second set of pictures into a second representation using inter prediction from the first set of pictures and without using temporal prediction for providing a switching point from the first resolution to a second resolution;

encode a third set of pictures having the second resolution into a third representation without using inter-layer prediction and without temporally referencing to pictures prior to the second set of pictures of the second representation; and encode an indication that the first and third set of pictures are encoded without using inter-layer prediction and that at least one picture of the second set of pictures is encoded using inter-layer prediction but without using temporal prediction.

According to a twelfth aspect, there is provided a method comprising:

decoding an indication that a first and third set of pictures are encoded without using inter-layer prediction and that at least one picture of a second set of pictures is encoded using inter-layer prediction but without using temporal prediction;

decoding the first set of pictures having a first resolution into a first representation;

decoding the second set of pictures from a second representation using inter prediction from the first set of pictures and without using temporal prediction for providing a switching point from the first resolution to a second resolution; and decoding the third set of pictures having the second resolution from a third representation without using inter-layer prediction and without temporally referencing to pictures prior to the second set of pictures of the second representation.

According to a thirteenth aspect, there is provided an apparatus comprising at least one processor and at least one memory including computer program code, the at least one memory and the computer program code configured to, with the at least one processor, cause the apparatus to:

decode an indication that a first and third set of pictures are encoded without using inter-layer prediction and that at least one picture of a second set of pictures is encoded using inter-layer prediction but without using temporal prediction;

decode the first set of pictures having a first resolution into a first representation;

decode the second set of pictures from a second representation using inter prediction from the first set of pictures and without using temporal prediction for providing a switching point from the first resolution to a second resolution; and decode the third set of pictures having the second resolution from a third representation without using inter-layer prediction and without temporally referencing to pictures prior to the second set of pictures of the second representation.

According to a fourteenth aspect, there is provided a computer program product embodied on a non-transitory computer readable medium, comprising computer program code configured to, when executed on at least one processor, cause an apparatus or a system to:

decode an indication that a first and third set of pictures are encoded without using inter-layer prediction and that at least one picture of a second set of pictures is encoded using inter-layer prediction but without using temporal prediction;

decode the first set of pictures having a first resolution into a first representation;

decode the second set of pictures from a second representation using inter prediction from the first set of pictures and without using temporal prediction for providing a switching point from the first resolution to a second resolution; and decode the third set of pictures having the second resolution from a third representation without using inter-layer prediction and without temporally referencing to pictures prior to the second set of pictures of the second representation.

BRIEF DESCRIPTION OF THE DRAWINGS

For a more complete understanding of example embodiments of the present invention, reference is now made to the following descriptions taken in connection with the accompanying drawings in which:

FIG. 5a shows schematically an embodiment of a decoder;

FIG. 5b shows schematically an embodiment of a spatial scalability decoding apparatus according to some embodiments of the invention;

FIG. 8 shows an example of a picture consisting of two tiles;

FIG. 12a illustrates using multiple adaptive resolution change representations when more than one resolution is present in an adaptation set;

FIGS. 12b to 12d illustrate an example of downloaded segments for different switching scenarios;

DETAILED DESCRIPTION OF SOME EXAMPLE EMBODIMENTS

Figure 2:
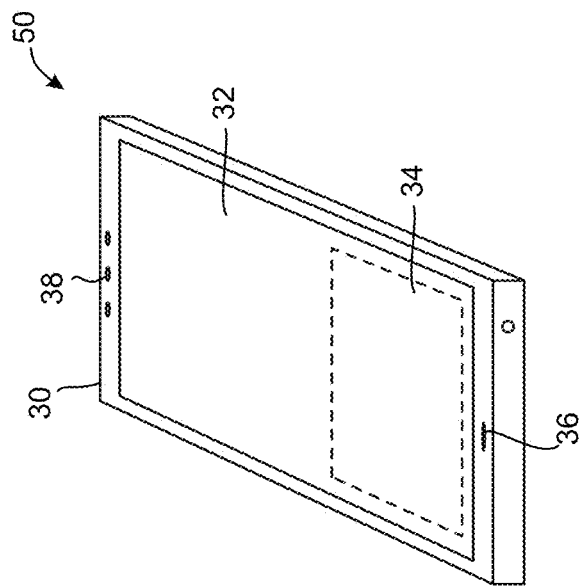
FIG. 2 shows schematically a user equipment suitable for employing some embodiments of the invention.

In the following, several embodiments of the invention will be described in the context of one video coding arrangement. It is to be noted, however, that the invention is not limited to this particular arrangement. In fact, the different embodiments have applications widely in any environment where improvement of reference picture handling is required. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

In the following, several embodiments are described using the convention of referring to (de)coding, which indicates that the embodiments may apply to decoding and/or encoding.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

There is a currently ongoing standardization project of High Efficiency Video Coding (HEVC) by the Joint Collaborative Team-Video Coding (JCT-VC) of VCEG and MPEG.

When describing H.264/AVC and HEVC as well as in example embodiments, common notation for arithmetic operators, logical operators, relational operators, bit-wise operators, assignment operators, and range notation e.g. as specified in H.264/AVC or a draft HEVC may be used. Furthermore, common mathematical functions e.g. as specified in H.264/AVC or a draft HEVC may be used and a common order of precedence and execution order (from left to right or from right to left) of operators e.g. as specified in H.264/AVC or a draft HEVC may be used.

When describing H.264/AVC and HEVC as well as in example embodiments, the following descriptors may be used to specify the parsing process of each syntax element.
  b(8): byte having any pattern of bit string (8 bits).
  se(v): signed integer Exp-Golomb-coded syntax element with the left bit first.
  u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with the most significant bit written first.
  ue(v): unsigned integer Exp-Golomb-coded syntax element with the left bit first.

An Exp-Golomb bit string may be converted to a code number (codeNum) for example using the following table:

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| ... | ... |

A code number corresponding to an Exp-Golomb bit string may be converted to se(v) for example using the following table:

| codeNum | syntax element value |
|---|---|
| 0 | 0 |
| 1 | 1 |
| 2 | −1 |
| 3 | 2 |
| 4 | −2 |
| 5 | 3 |
| 6 | −3 |
| ... | ... |

When describing H.264/AVC and HEVC as well as in example embodiments, syntax structures, semantics of syntax elements, and decoding process may be specified as follows. Syntax elements in the bitstream are represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

When describing H.264/AVC and HEVC as well as in example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a draft HEVC standard—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. In H.264/AVC and HEVC, a picture may either be a frame or a field. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

A partitioning may be defined as a division of a set into subsets such that each element of the set is in exactly one of the subsets. A picture partitioning may be defined as a division of a picture into smaller non-overlapping units. A block partitioning may be defined as a division of a block into smaller non-overlapping units, such as sub-blocks. In some cases term block partitioning may be considered to cover multiple levels of partitioning, for example partitioning of a picture into slices, and partitioning of each slice into smaller units, such as macroblocks of H.264/AVC. It is noted that the same unit, such as a picture, may have more than one partitioning. For example, a coding unit of a draft HEVC standard may be partitioned into prediction units and separately by another quadtree into transform units.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

During the course of HEVC standardization the terminology for example on picture partitioning units has evolved. In the next paragraphs, some non-limiting examples of HEVC terminology are provided.

In one draft version of the HEVC standard, pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can further be split into a combination of smaller CUs, e.g. by recursively splitting the LCU and resultant CUs. Each resulting CU may have at least one PU and at least one TU associated with it. Each PU and TU can further be split into smaller PUs and TUs in order to increase granularity of the prediction and prediction error coding processes, respectively. Each PU may have prediction information associated with it defining what kind of a prediction is to be applied for the pixels within that PU (e.g. motion vector information for inter predicted PUs and intra prediction directionality information for intra predicted PUs). Similarly, each TU may be associated with information describing the prediction error decoding process for the samples within the TU (including e.g. DCT coefficient information). It may be signalled at CU level whether prediction error coding is applied or not for each CU. In the case there is no prediction error residual associated with the CU, it can be considered there are no TUs for the CU. In some embodiments the PU splitting can be realized by splitting the CU into four equal size square PUs or splitting the CU into two rectangle PUs vertically or horizontally in a symmetric or asymmetric way. The division of the image into CUs, and division of CUs into PUs and TUs may be signalled in the bitstream allowing the decoder to reproduce the intended structure of these units.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as a prediction reference for the forthcoming frames in the video sequence.

In a draft HEVC standard, a picture can be partitioned in tiles, which are rectangular and contain an integer number of LCUs. In a draft HEVC standard, the partitioning to tiles forms a regular grid, where heights and widths of tiles differ from each other by one LCU at the maximum. In a draft HEVC, a slice is defined to be an integer number of coding tree units contained in one independent slice segment and all subsequent dependent slice segments (if any) that precede the next independent slice segment (if any) within the same access unit. In a draft HEVC standard, a slice segment is defined to be an integer number of coding tree units ordered consecutively in the tile scan and contained in a single NAL unit. The division of each picture into slice segments is a partitioning. In a draft HEVC standard, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In a draft HEVC standard, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. In a draft HEVC, a slice consists of an integer number of CUs. The CUs are scanned in the raster scan order of LCUs within tiles or within a picture, if tiles are not in use. Within an LCU, the CUs have a specific scan order.

A basic coding unit in a HEVC working draft 5 is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

A distinction between coding units and coding treeblocks may be defined for example as follows. A slice may be defined as a sequence of one or more coding tree units (CTU) in raster-scan order within a tile or within a picture if tiles are not in use. Each CTU may comprise one luma coding treeblock (CTB) and possibly (depending on the chroma format being used) two chroma CTBs. A CTU may be defined as a coding tree block of luma samples, two corresponding coding tree blocks of chroma samples of a picture that has three sample arrays, or a coding tree block of samples of a monochrome picture or a picture that is coded using three separate colour planes and syntax structures used to code the samples. The division of a slice into coding tree units may be regarded as a partitioning. A CTB may be defined as an N×N block of samples for some value of N. The division of one of the arrays that compose a picture that has three sample arrays or of the array that compose a picture in monochrome format or a picture that is coded using three separate colour planes into coding tree blocks may be regarded as a partitioning. A coding block may be defined as an N×N block of samples for some value of N. The division of a coding tree block into coding blocks may be regarded as a partitioning.

FIG. 8 shows an example of a picture consisting of two tiles partitioned into square coding units (solid lines) which have been further partitioned into rectangular prediction units (dashed lines).

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to, for example, enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit and whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In a draft HEVC standard, a two-byte NAL unit header is used for all specified NAL unit types. The first byte of the NAL unit header contains one reserved bit, a one-bit indication nal_ref_flag primarily indicating whether the picture carried in this access unit is a reference picture or a non-reference picture, and a six-bit NAL unit type indication. The second byte of the NAL unit header includes a three-bit temporal_id indication for temporal level and a five-bit reserved field (called reserved_one_5 bits) required to have a value equal to 1 in a draft HEVC standard. The temporal_id syntax element may be regarded as a temporal identifier for the NAL unit and TemporalId variable may be defined to be equal to the value of temporal_id. The five-bit reserved field is expected to be used by extensions such as a future scalable and 3D video extension. It is expected that these five bits would carry information on the scalability hierarchy, such as quality_id or similar, dependency_id or similar, any other type of layer identifier, view order index or similar, view identifier, an identifier similar to priority_id of SVC indicating a valid sub-bitstream extraction if all NAL units greater than a specific identifier value are removed from the bitstream. Without loss of generality, in some example embodiments a variable LayerId is derived from the value of reserved_one_5 bits for example as follows: LayerId=reserved_one_5 bits−1.

In a later draft HEVC standard, a two-byte NAL unit header is used for all specified NAL unit types. The NAL unit header contains one reserved bit, a six-bit NAL unit type indication, a six-bit reserved field (called reserved_zero_6 bits) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. Without loss of generality, in some example embodiments a variable LayerId is derived from the value of reserved_zero_6 bits for example as follows: LayerId=reserved_zero_6 bits. In some designs for scalable extensions of HEVC, such as in the document JCTVC-K1007, reserved_zero_6 bits are replaced by a layer identifier field e.g. referred to as nuh_layer_id. In the following, LayerId, nuh_layer_id and layer_id are used interchangeably unless otherwise indicated.

It is expected that reserved_one_5 bits, reserved_zero_6 bits and/or similar syntax elements in NAL unit header would carry information on the scalability hierarchy. For example, the LayerId value derived from reserved_one_5 bits, reserved_zero_6 bits and/or similar syntax elements may be mapped to values of variables or syntax elements describing different scalability dimensions, such as quality_id or similar, dependency_id or similar, any other type of layer identifier, view order index or similar, view identifier, an indication whether the NAL unit concerns depth or texture i.e. depth_flag or similar, or an identifier similar to priority_id of SVC indicating a valid sub-bitstream extraction if all NAL units greater than a specific identifier value are removed from the bitstream. reserved_one_5 bits, reserved_zero_6 bits and/or similar syntax elements may be partitioned into one or more syntax elements indicating scalability properties. For example, a certain number of bits among reserved_one_5 bits, reserved_zero_6 bits and/or similar syntax elements may be used for dependency_id or similar, while another certain number of bits among reserved_one_5 bits, reserved_zero_6 bits and/or similar syntax elements may be used for quality_id or similar. Alternatively, a mapping of LayerId values or similar to values of variables or syntax elements describing different scalability dimensions may be provided for example in a Video Parameter Set, a Sequence Parameter Set or another syntax structure.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In a draft HEVC standard, coded slice NAL units contain syntax elements representing one or more CU.

In H.264/AVC a coded slice NAL unit can be indicated to be a coded slice in an Instantaneous Decoding Refresh (IDR) picture or coded slice in a non-IDR picture.

In a draft HEVC standard, a coded slice NAL unit can be indicated to be one of the following types.

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |

| nal_unit_type | Name of nal_unit_type | Content of NAL unit and RBSP syntax structure |
|---|---|---|
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP BLA_N_LP | Coded slice segment of a BLA picture slice_segment_layer_rbsp( ) [Ed. (YK): BLA_W_DLP -> BLA_W_RADL?] |
| 19, 20 | IDR_W_DLP IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_RAP_VCL22 ... RSV_RAP_VCL23 | Reserved // reserved RAP VCL NAL unit types |
| 24 ... 31 | RSV_VCL24 ... RSV_VCL31 | Reserved // reserved non-RAP VCL NAL unit types |

In a draft HEVC standard, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture is a picture where each slice or slice segment has nal_unit_type in the range of 16 to 23, inclusive. A RAP picture contains only intra-coded slices, and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some earlier drafts of the HEVC standard, a RASL picture was referred to a Tagged for Discard (TED) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some earlier drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in a draft HEVC standard, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

In scalable and/or multiview video coding, at least the following principles for encoding pictures and/or access units with random access property may be supported.

An intra-coded picture without inter-layer/inter-view prediction. Such a picture enables random access capability to the layer/view it resides.

A picture without inter prediction (i.e. temporal prediction) but with inter-layer/inter-view prediction allowed. Such a picture enables starting the decoding of the layer/view the picture resides provided that all the reference layers/views are available. In single-loop decoding, it may be sufficient if the coded reference layers/views are available (which can be the case e.g. for IDR pictures having dependency_id greater than 0 in SVC). In multi-loop decoding, it may be needed that the reference layers/views are decoded. Such a picture may, for example, be referred to as a stepwise layer access (STLA) picture or an enhancement layer RAP picture.

An anchor access unit or a complete RAP access unit may be defined to include only intra-coded picture(s) and STLA pictures in all layers. In multi-loop decoding, such an access unit enables random access to all layers/views. An example of such an access unit is the MVC anchor access unit (among which type the IDR access unit is a special case).

A stepwise RAP access unit may be defined to include a RAP picture in the base layer but need not contain a RAP picture in all enhancement layers. A stepwise RAP access unit enables starting of base-layer decoding, while enhancement layer decoding may be started when the enhancement layer contains a RAP picture, and (in the case of multi-loop decoding) all its reference layers/views are decoded at that point.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit (having NAL unit type equal to 7) containing all the data for H.264/AVC VCL NAL units in the sequence, the sequence parameter set extension NAL unit containing the data for auxiliary coded pictures, and the subset sequence parameter set for MVC and SVC VCL NAL units. The syntax structure included in the sequence parameter set NAL unit of H.264/AVC (having NAL unit type equal to 7) may be referred to as sequence parameter set data, seq_parameter_set_data, or base SPS data. For example, profile, level, the picture size and the chroma sampling format may be included in the base SPS data. A picture parameter set contains such parameters that are likely to be unchanged in several coded pictures.

In a draft HEVC, there is also another type of a parameter set, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), sample adaptive offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS.

A draft HEVC standard also includes yet another type of a parameter set, called a video parameter set (VPS), which was proposed for example in document JCTVC-H0388 (http://phenix.int-evry.fr/jct/doc_end_user/documents/8_San %20Jose/wg11/JCTVC-H0388-v4.zip). A video parameter set RBSP may include parameters that can be referred to by one or more sequence parameter set RBSPs.

The relationship and hierarchy between VPS, SPS, and PPS may be described as follows. VPS resides one level above SPS in the parameter set hierarchy and in the context of scalability and/or 3DV. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain TemporalId values) of a layer representation.

An example syntax of a VPS extension intended to be a part of the VPS is provided in the following. The presented VPS extension provides the dependency relationships among other things.

| | Descriptor |
|---|---|
| vps_extension( ) { | |
|   while( !byte_aligned( ) ) | |
|     vps_extension_byte_alignment_reserved_one_bit | u(1) |
|   for( i = 0, numScalabilityTypes = 0; i < 16; i++ ) { | |
|     scalability_mask[ i ] | u(1) |
|     numScalabilityTypes += scalability_mask[ i ] | |
|   } | |
|   for( j = 0; j <numScalabilityTypes; j++ ) | |
|     dimension_id_len_minus1[ j ] | u(3) |
|   vps_nuh_layer_id_present_flag | u(1) |
|   for( i = 1; i <= vps_max_layers_minus1; i++ ) { | |
|     if( vps_nuh_layer_id_present_flag ) | |
|       layer_id_in_nuh[ i ] | u(6) |
|     for( j = 0; j < numScalabilityTypes; j++ ) | |
|       dimension_id[ i ][ j ] | u(v) |
|   } | |
|   for( i = 1; i <= vps_max_layers_minus1; i++ ) { | |
|     num_direct_ref_layers[ i ] | u(6) |
|     for( j = 0; j < num_direct_ref_layers[ i ]; j++ ) | |
|       ref_layer_id[ i ][ j ] | u(6) |
|   } | |
| } | |

The semantics of the presented VPS extension may be specified as described in the following paragraphs.

vps_extension_byte_alignment_reserved_one_bit is equal to 1 and is used to achieve byte alignment. scalability_mask[i] equal to 1 indicates that dimension_id syntax elements corresponding to the i-th scalability dimension in the table below are present. scalability_mask[i] equal to 0 indicates that dimension_id syntax elements corresponding to the i-th scalability dimension are not present.

| scalability_mask index | Scalability dimension | ScalabilityId mapping |
|---|---|---|
| 0 | reference index based spatial or quality scalability | DependencyId |
| 1 | depth | DepthFlag |
| 2 | multiview | ViewId |
| 3-15 | Reserved | | dimension_id_len_minus1[j] plus 1 specifies the length, in bits, of the dimension_id[i][j] syntax element. vps_nuh_layer_id_present_flag specifies whether the layer_id_in_nuh[i] syntax is present. layer_id_in_nuh[i] specifies the value of the nuh_layer_id syntax element in VCL NAL units of the i-th layer. When not present, the value of layer_id_in_nuh[i] is inferred to be equal to i. The variable LayerIdInVps[layer_id_in_nuh[i]] is set equal to i dimension_id[i][j] specifies the identifier of the j-th scalability dimension type of the i-th layer. When not present, the value of dimension_id[i][j] is inferred to be equal to 0. The number of bits used for the representation of dimension_id[i][j] is dimension_id_len_minus1[j]+1 bits. The variables ScalabilityId[layerIdInVps][scalabilityMaskIndex], DependencyId[layerIdInNuh], DepthFlag[layerIdInNuh], and ViewOrderIdx[layerIdInNuh] are derived as follows:

```
for (i = 0; i <= vps_max_layers_minus1; i++) {
  for( smIdx= 0, j =0; smIdx< 16; smIdx ++ )
    if( ( i != 0) && scalability_mask[ smIdx ] )
      ScalabilityId[ i ][ smIdx ] = dimension_id[ i ][ j++ ]
    else
      ScalabilityId[ i ][ smIdx ] = 0
  DependencyId[ layer_id_in_nuh[ i ] ] = ScalabilityId[ i ][ 0 ]
  DepthFlag[ layer_id_in_nuh[ i ] ] = ScalabilityId[ i ][ 1 ]
  ViewId[ layer_id_in_nuh[ i ] ] = ScalabilityId[ i ][ 2 ]
}
``` num_direct_ref_layers[i] specifies the number of layers the i-th layer directly references.

H.264/AVC and HEVC syntax allows many instances of parameter sets, and each instance is identified with a unique identifier. In order to limit the memory usage needed for parameter sets, the value range for parameter set identifiers has been limited. In H.264/AVC and a draft HEVC standard, each slice header includes the identifier of the picture parameter set that is active for the decoding of the picture that contains the slice, and each picture parameter set contains the identifier of the active sequence parameter set. In a HEVC standard, a slice header additionally contains an APS identifier. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message. In the following, non-limiting examples of activation of parameter sets in a draft HEVC standard are given.

Each adaptation parameter set RBSP is initially considered not active at the start of the operation of the decoding process. At most one adaptation parameter set RBSP is considered active at any given moment during the operation of the decoding process, and the activation of any particular adaptation parameter set RBSP results in the deactivation of the previously-active adaptation parameter set RBSP (if any).

When an adaptation parameter set RBSP (with a particular value of aps_id) is not active and it is referred to by a coded slice NAL unit (using that value of aps_id), it is activated. This adaptation parameter set RBSP is called the active adaptation parameter set RB SP until it is deactivated by the activation of another adaptation parameter set RBSP. An adaptation parameter set RBSP, with that particular value of aps_id, is available to the decoding process prior to its activation, included in at least one access unit with temporal_id equal to or less than the temporal_id of the adaptation parameter set NAL unit, unless the adaptation parameter set is provided through external means.

Each picture parameter set RBSP is initially considered not active at the start of the operation of the decoding process. At most one picture parameter set RBSP is considered active at any given moment during the operation of the decoding process, and the activation of any particular picture parameter set RB SP results in the deactivation of the previously-active picture parameter set RBSP (if any).

When a picture parameter set RBSP (with a particular value of pic_parameter_set_id) is not active and it is referred to by a coded slice NAL unit or coded slice data partition A NAL unit (using that value of pic_parameter_set_id), it is activated. This picture parameter set RBSP is called the active picture parameter set RBSP until it is deactivated by the activation of another picture parameter set RBSP. A picture parameter set RBSP, with that particular value of pic_parameter_set_id, is available to the decoding process prior to its activation, included in at least one access unit with temporal_id equal to or less than the temporal_id of the picture parameter set NAL unit, unless the picture parameter set is provided through external means.

Each sequence parameter set RBSP is initially considered not active at the start of the operation of the decoding process. At most one sequence parameter set RBSP is considered active at any given moment during the operation of the decoding process, and the activation of any particular sequence parameter set RBSP results in the deactivation of the previously-active sequence parameter set RBSP (if any).

When a sequence parameter set RBSP (with a particular value of seq_parameter_set_id) is not already active and it is referred to by activation of a picture parameter set RBSP (using that value of seq_parameter_set_id) or is referred to by an SEI NAL unit containing a buffering period SEI message (using that value of seq_parameter_set_id), it is activated. This sequence parameter set RBSP is called the active sequence parameter set RBSP until it is deactivated by the activation of another sequence parameter set RBSP. A sequence parameter set RBSP, with that particular value of seq_parameter_set_id is available to the decoding process prior to its activation, included in at least one access unit with temporal_id equal to 0, unless the sequence parameter set is provided through external means. An activated sequence parameter set RBSP remains active for the entire coded video sequence.

Each video parameter set RBSP is initially considered not active at the start of the operation of the decoding process. At most one video parameter set RBSP is considered active at any given moment during the operation of the decoding process, and the activation of any particular video parameter set RBSP results in the deactivation of the previously-active video parameter set RBSP (if any).

When a video parameter set RBSP (with a particular value of video_parameter_set_id) is not already active and it is referred to by activation of a sequence parameter set RBSP (using that value of video_parameter_set_id), it is activated. This video parameter set RBSP is called the active video parameter set RBSP until it is deactivated by the activation of another video parameter set RBSP. A video parameter set RBSP, with that particular value of video_parameter_set_id is available to the decoding process prior to its activation, included in at least one access unit with temporal_id equal to 0, unless the video parameter set is provided through external means. An activated video parameter set RBSP remains active for the entire coded video sequence.

During operation of the decoding process in a draft HEVC standard, the values of parameters of the active video parameter set, the active sequence parameter set, the active picture parameter set RBSP and the active adaptation parameter set RBSP are considered in effect. For interpretation of SEI messages, the values of the active video parameter set, the active sequence parameter set, the active picture parameter set RBSP and the active adaptation parameter set RBSP for the operation of the decoding process for the VCL NAL units of the coded picture in the same access unit are considered in effect unless otherwise specified in the SEI message semantics.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC and HEVC, an access unit comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In H.264/AVC, a coded video sequence is defined to be a sequence of consecutive access units in decoding order from an IDR access unit, inclusive, to the next IDR access unit, exclusive, or to the end of the bitstream, whichever appears earlier. In a draft HEVC standard, a coded video sequence is defined to be a sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. In HEVC a closed GOP may also start from a BLA_W_DLP or a BLA_N_LP picture. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. The relative decoding order of the pictures is illustrated by the numerals inside the pictures. Any picture in the previous SOP has a smaller decoding order than any picture in the current SOP and any picture in the next SOP has a larger decoding order than any picture in the current SOP. The term group of pictures (GOP) may sometimes be used interchangeably with the term SOP and having the same semantics as the semantics of SOP rather than the semantics of closed or open GOP as described above.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. In H.264/AVC, the NAL unit header indicates the type of the NAL unit and whether a coded slice contained in the NAL unit is a part of a reference picture or a non-reference picture.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

Filtering may be used to reduce various artifacts such as blocking, ringing etc. from the reference images. After motion compensation followed by adding inverse transformed residual, a reconstructed picture is obtained. This picture may have various artifacts such as blocking, ringing etc. In order to eliminate the artifacts, various post-processing operations may be applied. If the post-processed pictures are used as reference in the motion compensation loop, then the post-processing operations/filters are usually called loop filters. By employing loop filters, the quality of the reference pictures increases. As a result, better coding efficiency can be achieved.

Filtering may comprise e.g. a deblocking filter, a Sample Adaptive Offset (SAO) filter and/or an Adaptive Loop Filter (ALF).

A deblocking filter may be used as one of the loop filters. A deblocking filter is available in both H.264/AVC and HEVC standards. An aim of the deblocking filter is to remove the blocking artifacts occurring in the boundaries of the blocks. This may be achieved by filtering along the block boundaries.

In SAO, a picture is divided into regions where a separate SAO decision is made for each region. The SAO information in a region is encapsulated in a SAO parameters adaptation unit (SAO unit) and in HEVC, the basic unit for adapting SAO parameters is CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in some embodiments divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. The five categories are described as follows:

1. Current sample value is smaller than the two neighbour samples
2. Current sample value is smaller than one of the neighbors and equal to the other neighbor
3. Current sample value is greater than one of the neighbors and equal to the other neighbor
4. Current sample value is greater than two neighbour samples
5. None of the above These five categories are not required to be signalled to the decoder because the classification is based on only reconstructed samples, which may be available and identical in both the encoder and decoder. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The SAO parameters may be signalled as interleaved in CTU data. Above CTU, slice header contains a syntax element specifying whether SAO is used in the slice. If SAO is used, then two additional syntax elements specify whether SAO is applied to Cb and Cr components. For each CTU, there are three options: 1) copying SAO parameters from the left CTU, 2) copying SAO parameters from the above CTU, or 3) signalling new SAO parameters.

While a specific implementation of SAO is described above, it should be understood that other implementations of SAO, which are similar to the above-described implementation, may also be possible. For example, rather than signaling SAO parameters as interleaved in CTU data, a picture-based signaling using a quad-tree segmentation may be used. The merging of SAO parameters (i.e. using the same parameters than in the CTU left or above) or the quad-tree structure may be determined by the encoder for example through a rate-distortion optimization process.

The adaptive loop filter (ALF) is another method to enhance quality of the reconstructed samples. This may be achieved by filtering the sample values in the loop. ALF is a finite impulse response (FIR) filter for which the filter coefficients are determined by the encoder and encoded into the bitstream. The encoder may choose filter coefficients that attempt to minimize distortion relative to the original uncompressed picture e.g. with a least-squares method or Wiener filter optimization. The filter coefficients may for example reside in an Adaptation Parameter Set or slice header or they may appear in the slice data for CUs in an interleaved manner with other CU-specific data.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC and HEVC, as many other video compression standards, divide a picture into a mesh of rectangles, for each of which a similar block in one of the reference pictures is indicated for inter prediction. The location of the prediction block is coded as a motion vector that indicates the position of the prediction block relative to the block being coded.

Inter prediction process may be characterized for example using one or more of the following factors.

The Accuracy of Motion Vector Representation.

For example, motion vectors may be of quarter-pixel accuracy, half-pixel accuracy or full-pixel accuracy and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated prediction in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on a block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion Vector Prediction.

In order to represent motion vectors efficiently in bit-streams, motion vectors may be coded differentially with respect to a block-specific predicted motion vector. In many video codecs, the predicted motion vectors are created in a predefined way, for example by calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or co-located blocks in temporal reference picture. Differential coding of motion vectors is typically disabled across slice boundaries.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P slices may be uni-predicted or intra-predicted. The reference pictures for a bi-predictive picture may not be limited to be the subsequent picture and the previous picture in output order, but rather any reference pictures may be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to prediction from a reference picture in reference picture list 0, and prediction in backward direction may refer to prediction from a reference picture in reference picture list 1, even though the reference pictures for prediction may have any decoding or output order relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated. The weights for explicit weighted prediction may be indicated for example in one or more of the following syntax structure: a slice header, a picture header, a picture parameter set, an adaptation parameter set or any similar syntax structure.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the TU (including e.g. DCT coefficient information). It may be signalled at CU level whether prediction error coding is applied or not for each CU. In the case there is no prediction error residual associated with the CU, it can be considered there are no TUs for the CU.

In some coding formats and codecs, a distinction is made between so-called short-term and long-term reference pictures. This distinction may affect some decoding processes such as motion vector scaling in the temporal direct mode or implicit weighted prediction. If both of the reference pictures used for the temporal direct mode are short-term reference pictures, the motion vector used in the prediction may be scaled according to the picture order count (POC) difference between the current picture and each of the reference pictures. However, if at least one reference picture for the temporal direct mode is a long-term reference picture, default scaling of the motion vector may be used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In a draft HEVC standard, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) is constructed after the final reference picture lists (List 0 and List 1) have been constructed. The combined list may be used for uni-prediction (also known as uni-directional prediction) within B slices.

A reference picture list, such as reference picture list 0 and reference picture list 1, may be constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

The combined list in a draft HEVC standard may be constructed as follows. If the modification flag for the combined list is zero, the combined list is constructed by an implicit mechanism; otherwise it is constructed by reference picture combination commands included in the bitstream. In the implicit mechanism, reference pictures in List C are mapped to reference pictures from List 0 and List 1 in an interleaved fashion starting from the first entry of List 0, followed by the first entry of List 1 and so forth. Any reference picture that has already been mapped in List C is not mapped again. In the explicit mechanism, the number of entries in List C is signaled, followed by the mapping from an entry in List 0 or List 1 to each entry of List C. In addition, when List 0 and List 1 are identical the encoder has the option of setting the ref_pic_list_combination_flag to 0 to indicate that no reference pictures from List 1 are mapped, and that List C is equivalent to List 0.

Figure 6:
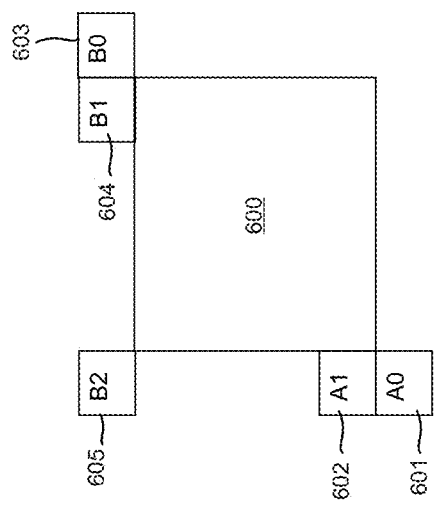
FIG. 6 depicts an example of a current block and five spatial neighbors usable as motion prediction candidates.

The advanced motion vector prediction (AMVP) may operate for example as follows, while other similar realizations of advanced motion vector prediction are also possible for example with different candidate position sets and candidate locations with candidate position sets. Two spatial motion vector predictors (MVPs) may be derived and a temporal motion vector predictor (TMVP) may be derived. They may be selected among the positions shown in FIG. 6: three spatial motion vector predictor candidate positions 603, 604, 605 located above the current prediction block 600 (B0, B1, B2) and two 601, 602 on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for the temporal motion vector predictor may be indicated by the encoder in the slice header (e.g. as a collocated_ref_idx syntax element). The motion vector obtained from the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate.

In addition to predicting the motion vector values, the reference index of previously coded/decoded picture can be predicted. The reference index may be predicted from adjacent blocks and/or from co-located blocks in a temporal reference picture.

Many high efficiency video codecs such as a draft HEVC codec employ an additional motion information coding/decoding mechanism, often called merging/merge mode/process/mechanism, where all the motion information of a block/PU is predicted and used without any modification/correction. The aforementioned motion information for a PU may comprise 1) The information whether 'the PU is uni-predicted using only reference picture list0' or 'the PU is uni-predicted using only reference picture list1' or 'the PU is bi-predicted using both reference picture list0 and list1'; 2) Motion vector value corresponding to the reference picture list0; 3) Reference picture index in the reference picture list0; 4) Motion vector value corresponding to the reference picture list1; and 5) Reference picture index in the reference picture list1. Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

There may be a reference picture lists combination syntax structure, created into the bitstream by an encoder and decoded from the bitstream by a decoder, which indicates the contents of a combined reference picture list. The syntax structure may indicate that the reference picture list 0 and the reference picture list 1 are combined to be an additional reference picture lists combination (e.g. a merge list) used for the prediction units being uni-directional predicted. The syntax structure may include a flag which, when equal to a certain value, indicates that the reference picture list 0 and the reference picture list 1 are identical thus the reference picture list 0 is used as the reference picture lists combination. The syntax structure may include a list of entries, each specifying a reference picture list (list 0 or list 1) and a reference index to the specified list, where an entry specifies a reference picture to be included in the combined reference picture list.

A syntax structure for decoded reference picture marking may exist in a video coding system. For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

A coding technique known as isolated regions is based on constraining in-picture prediction and inter prediction jointly. An isolated region in a picture can contain any macroblock (or alike) locations, and a picture can contain zero or more isolated regions that do not overlap. A leftover region, if any, is the area of the picture that is not covered by any isolated region of a picture. When coding an isolated region, at least some types of in-picture prediction is disabled across its boundaries. A leftover region may be predicted from isolated regions of the same picture.

A coded isolated region can be decoded without the presence of any other isolated or leftover region of the same coded picture. It may be necessary to decode all isolated regions of a picture before the leftover region. In some implementations, an isolated region or a leftover region contains at least one slice.

Pictures, whose isolated regions are predicted from each other, may be grouped into an isolated-region picture group. An isolated region can be inter-predicted from the corresponding isolated region in other pictures within the same isolated-region picture group, whereas inter prediction from other isolated regions or outside the isolated-region picture group may be disallowed. A leftover region may be inter-predicted from any isolated region. The shape, location, and size of coupled isolated regions may evolve from picture to picture in an isolated-region picture group.

Coding of isolated regions in the H.264/AVC codec may be based on slice groups. The mapping of macroblock locations to slice groups may be specified in the picture parameter set. The H.264/AVC syntax includes syntax to code certain slice group patterns, which can be categorized into two types, static and evolving. The static slice groups stay unchanged as long as the picture parameter set is valid, whereas the evolving slice groups can change picture by picture according to the corresponding parameters in the picture parameter set and a slice group change cycle parameter in the slice header. The static slice group patterns include interleaved, checkerboard, rectangular oriented, and freeform. The evolving slice group patterns include horizontal wipe, vertical wipe, box-in, and box-out. The rectangular oriented pattern and the evolving patterns are especially suited for coding of isolated regions and are described more carefully in the following.

For a rectangular oriented slice group pattern, a desired number of rectangles are specified within the picture area. A foreground slice group includes the macroblock locations that are within the corresponding rectangle but excludes the macroblock locations that are already allocated by slice groups specified earlier. A leftover slice group contains the macroblocks that are not covered by the foreground slice groups.

An evolving slice group is specified by indicating the scan order of macroblock locations and the change rate of the size of the slice group in number of macroblocks per picture. Each coded picture is associated with a slice group change cycle parameter (conveyed in the slice header). The change cycle multiplied by the change rate indicates the number of macroblocks in the first slice group. The second slice group contains the rest of the macroblock locations.

In H.264/AVC in-picture prediction is disabled across slice group boundaries, because slice group boundaries lie in slice boundaries. Therefore each slice group is an isolated region or leftover region.

Each slice group has an identification number within a picture. Encoders can restrict the motion vectors in a way that they only refer to the decoded macroblocks belonging to slice groups having the same identification number as the slice group to be encoded. Encoders should take into account the fact that a range of source samples is needed in fractional pixel interpolation and all the source samples should be within a particular slice group.

The H.264/AVC codec includes a deblocking loop filter. Loop filtering is applied to each 4×4 block boundary, but loop filtering can be turned off by the encoder at slice boundaries. If loop filtering is turned off at slice boundaries, perfect reconstructed pictures at the decoder can be achieved when performing gradual random access. Otherwise, reconstructed pictures may be imperfect in content even after the recovery point.

The recovery point SEI message and the motion constrained slice group set SEI message of the H.264/AVC standard can be used to indicate that some slice groups are coded as isolated regions with restricted motion vectors. Decoders may utilize the information for example to achieve faster random access or to save in processing time by ignoring the leftover region.

A sub-picture concept has been proposed for HEVC e.g. in document JCTVC-I0356<http://phenix.int-evry.fr/jct/doc_end_user/documents/9_Geneva/wg11/JCTVC-I0356-v1.zip>, which is similar to rectangular isolated regions or rectangular motion-constrained slice group sets of H.264/AVC. The sub-picture concept proposed in JCTVC-I0356 is described in the following, while it should be understood that sub-pictures may be defined otherwise similarly but not identically to what is described below. In the sub-picture concept, the picture is partitioned into predefined rectangular regions. Each sub-picture would be processed as an independent picture except that all sub-pictures constituting a picture share the same global information such as SPS, PPS and reference picture sets. Sub-pictures are similar to tiles geometrically. Their properties are as follows: They are LCU-aligned rectangular regions specified at sequence level. Sub-pictures in a picture may be scanned in sub-picture raster scan of the picture. Each sub-picture starts a new slice. If multiple tiles are present in a picture, sub-picture boundaries and tiles boundaries may be aligned. There may be no loop filtering across sub-pictures. There may be no prediction of sample value and motion info outside the sub-picture, and no sample value at a fractional sample position that is derived using one or more sample values outside the sub-picture may be used to inter predict any sample within the sub-picture. If motion vectors point to regions outside of a sub-picture, a padding process defined for picture boundaries may be applied. LCUs are scanned in raster order within sub-pictures unless a sub-picture contains more than one tile. Tiles within a sub-picture are scanned in tile raster scan of the sub-picture. Tiles cannot cross sub-picture boundaries except for the default one tile per picture case. All coding mechanisms that are available at picture level are supported at sub-picture level.

Scalable video coding refers to a coding structure where one bitstream can contain multiple representations of the content at different bitrates, resolutions and/or frame rates. In these cases the receiver can extract the desired representation depending on its characteristics (e.g. resolution that matches best with the resolution of the display of the device). Alternatively, a server or a network element can extract the portions of the bitstream to be transmitted to the receiver depending on e.g. the network characteristics or processing capabilities of the receiver.

A scalable bitstream may consist of a base layer providing the lowest quality video available and one or more enhancement layers that enhance the video quality when received and decoded together with the lower layers. An enhancement layer may enhance the temporal resolution (i.e., the frame rate), the spatial resolution, or simply the quality of the video content represented by another layer or part thereof. In order to improve coding efficiency for the enhancement layers, the coded representation of that layer may depend on the lower layers. For example, the motion and mode information of the enhancement layer can be predicted from lower layers. Similarly the pixel data of the lower layers can be used to create prediction for the enhancement layer(s).

Each scalable layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS). FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer. A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

The scalability structure in the SVC draft is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL-1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVCV standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_ref_active_1x_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

In an H.264/AVC bit stream, coded pictures in one coded video sequence uses the same sequence parameter set, and at any time instance during the decoding process, only one sequence parameter set is active. In SVC, coded pictures from different scalable layers may use different sequence parameter sets. If different sequence parameter sets are used, then, at any time instant during the decoding process, there may be more than one active sequence picture parameter set. In the SVC specification, the one for the top layer is denoted as the active sequence picture parameter set, while the rest are referred to as layer active sequence picture parameter sets. Any given active sequence parameter set remains unchanged throughout a coded video sequence in the layer in which the active sequence parameter set is referred to.

A scalable nesting SEI message has been specified in SVC. The scalable nesting SEI message provides a mechanism for associating SEI messages with subsets of a bitstream, such as indicated dependency representations or other scalable layers. A scalable nesting SEI message contains one or more SEI messages that are not scalable nesting SEI messages themselves. An SEI message contained in a scalable nesting SEI message is referred to as a nested SEI message. An SEI message not contained in a scalable nesting SEI message is referred to as a non-nested SEI message.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

An Adaptive Resolution Change refers to dynamically changing the resolution within the video sequence, for example in video-conferencing use-cases. Adaptive Resolution Change may be used e.g. for better network adaptation and error resilience. For better adaptation to changing network requirements for different content, it may be desired to be able to change both the temporal/spatial resolution in addition to quality. The Adaptive Resolution Change may also enable a fast start, wherein the start-up time of a session may be able to be increased by first sending a low resolution frame and then increasing the resolution. The Adaptive Resolution Change may further be used in composing a conference. For example, when a person starts speaking, his/her corresponding resolution may be increased. Doing this with an IDR frame may cause a "blip" in the quality as IDR frames need to be coded at a relatively low quality so that the delay is not significantly increased.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

As indicated earlier, MVC is an extension of H.264/AVC. Many of the definitions, concepts, syntax structures, semantics, and decoding processes of H.264/AVC apply also to MVC as such or with certain generalizations or constraints. Some definitions, concepts, syntax structures, semantics, and decoding processes of MVC are described in the following.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit results in one decoded picture consisting of one or more decoded view components, when decoding errors, bitstream errors or other errors which may affect the decoding do not occur. In other words, an access unit in MVC contains the view components of the views for one output time instance.

A view component in MVC is referred to as a coded representation of a view in a single access unit.

Inter-view prediction may be used in MVC and refers to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

As mentioned earlier, non-base views of MVC bitstreams may refer to a subset sequence parameter set NAL unit. A subset sequence parameter set for MVC includes a base SPS data structure and an sequence parameter set MVC extension data structure. In MVC, coded pictures from different views may use different sequence parameter sets. An SPS in MVC (specifically the sequence parameter set MVC extension part of the SPS in MVC) can contain the view dependency information for inter-view prediction. This may be used for example by signaling-aware media gateways to construct the view dependency tree.

In SVC and MVC, a prefix NAL unit may be defined as a NAL unit that immediately precedes in decoding order a VCL NAL unit for base layer/view coded slices. The NAL unit that immediately succeeds the prefix NAL unit in decoding order may be referred to as the associated NAL unit. The prefix NAL unit contains data associated with the associated NAL unit, which may be considered to be part of the associated NAL unit. The prefix NAL unit may be used to include syntax elements that affect the decoding of the base layer/view coded slices, when SVC or MVC decoding process is in use. An H.264/AVC base layer/view decoder may omit the prefix NAL unit in its decoding process.

In scalable multiview coding, the same bitstream may contain coded view components of multiple views and at least some coded view components may be coded using quality and/or spatial scalability.

A texture view refers to a view that represents ordinary video content, for example has been captured using an ordinary camera, and is usually suitable for rendering on a display. A texture view typically comprises pictures having three components, one luma component and two chroma components. In the following, a texture picture typically comprises all its component pictures or color components unless otherwise indicated for example with terms luma texture picture and chroma texture picture.

A depth view refers to a view that represents distance information of a texture sample from the camera sensor, disparity or parallax information between a texture sample and a respective texture sample in another view, or similar information. A depth view may comprise depth pictures (a.k.a. depth maps) having one component, similar to the luma component of texture views. A depth map is an image with per-pixel depth information or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis. The semantics of depth map values may for example include the following:

1. Each luma sample value in a coded depth view component represents an inverse of real-world distance (Z) value, i.e. 1/Z, normalized in the dynamic range of the luma samples, such as to the range of 0 to 255, inclusive, for 8-bit luma representation. The normalization may be done in a manner where the quantization 1/Z is uniform in terms of disparity.

2. Each luma sample value in a coded depth view component represents an inverse of real-world distance (Z) value, i.e. 1/Z, which is mapped to the dynamic range of the luma samples, such to the range of 0 to 255, inclusive, for 8-bit luma representation, using a mapping function f(1/Z) or table, such as a piece-wise linear mapping. In other words, depth map values result in applying the function f(1/Z).
3. Each luma sample value in a coded depth view component represents a real-world distance (Z) value normalized in the dynamic range of the luma samples, such to the range of 0 to 255, inclusive, for 8-bit luma representation.
4. Each luma sample value in a coded depth view component represents a disparity or parallax value from the present depth view to another indicated or derived depth view or view position.

While phrases such as depth view, depth view component, depth picture and depth map are used to describe various embodiments, it is to be understood that any semantics of depth map values may be used in various embodiments including but not limited to the ones described above. For example, embodiments of the invention may be applied for depth pictures where sample values indicate disparity values.

An encoding system or any other entity creating or modifying a bitstream including coded depth maps may create and include information on the semantics of depth samples and on the quantization scheme of depth samples into the bitstream. Such information on the semantics of depth samples and on the quantization scheme of depth samples may be for example included in a video parameter set structure, in a sequence parameter set structure, or in an SEI message.

Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. The MVD representation contains a number of texture views and respective depth views. In the LDV representation, the texture and depth of the central view are represented conventionally, while the texture and depth of the other views are partially represented and cover only the dis-occluded areas required for correct view synthesis of intermediate views.

A texture view component may be defined as a coded representation of the texture of a view in a single access unit. A texture view component in depth-enhanced video bitstream may be coded in a manner that is compatible with a single-view texture bitstream or a multi-view texture bitstream so that a single-view or multi-view decoder can decode the texture views even if it has no capability to decode depth views. For example, an H.264/AVC decoder may decode a single texture view from a depth-enhanced H.264/AVC bitstream. A texture view component may alternatively be coded in a manner that a decoder capable of single-view or multi-view texture decoding, such H.264/AVC or MVC decoder, is not able to decode the texture view component for example because it uses depth-based coding tools. A depth view component may be defined as a coded representation of the depth of a view in a single access unit. A view component pair may be defined as a texture view component and a depth view component of the same view within the same access unit.

Depth-enhanced video may be coded in a manner where texture and depth are coded independently of each other. For example, texture views may be coded as one MVC bitstream and depth views may be coded as another MVC bitstream. Depth-enhanced video may also be coded in a manner where texture and depth are jointly coded. In a form a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

Depth-enhanced video formats enable generation of virtual views or pictures at camera positions that are not represented by any of the coded views. Generally, any depth-image-based rendering (DIBR) algorithm may be used for synthesizing views.

A view synthesis picture may also be referred to as synthetic reference component, which may be defined to contain samples that may be used for view synthesis prediction. A synthetic reference component may be used as reference picture for view synthesis prediction but is typically not output or displayed. A view synthesis picture may be generated for the same camera location assuming the same camera parameters as for the picture being coded or decoded.

A view-synthesized picture may be introduced in the reference picture list in a similar way as is done with inter-view reference pictures. Signaling and operations with reference picture list in the case of view synthesis prediction may remain identical or similar to those specified in H.264/AVC or HEVC.

A synthesized picture resulting from VSP may be included in the initial reference picture lists List0 and List1 for example following temporal and inter-view reference frames. However, reference picture list modification syntax (i.e., RPLR commands) may be extended to support VSP reference pictures, thus the encoder can order reference picture lists at any order, indicate the final order with RPLR commands in the bitstream, causing the decoder to reconstruct the reference picture lists having the same final order.

Processes for predicting from view synthesis reference picture, such as motion information derivation, may remain identical or similar to processes specified for inter, inter-layer, and inter-view prediction of H.264/AVC or HEVC. Alternatively or in addition, specific coding modes for the view synthesis prediction may be specified and signaled by the encoder in the bitstream. In other words, VSP may alternatively or also be used in some encoding and decoding arrangements as a separate mode from intra, inter, inter-view and other coding modes. For example, in a VSP skip/direct mode the motion vector difference (de)coding and the (de)coding of the residual prediction error for example using transform-based coding may also be omitted. For example, if a macroblock may be indicated within the bitstream to be coded using a skip/direct mode, it may further be indicated within the bitstream whether a VSP frame is used as reference. Alternatively or in addition, view-synthesized reference blocks, rather than or in addition to complete view synthesis reference pictures, may be generated by the encoder and/or the decoder and used as prediction reference for various prediction processes.

Many video encoders utilize the Lagrangian cost function to find rate-distortion optimal coding modes, for example the desired macroblock mode and associated motion vectors. This type of cost function uses a weighting factor or $\lambda$ to tie together the exact or estimated image distortion due to lossy coding methods and the exact or estimated amount of information required to represent the pixel/sample values in an image area. The Lagrangian cost function may be represented by the equation:

$$C=D+\lambda R$$

where C is the Lagrangian cost to be minimised, D is the image distortion (for example, the mean-squared error between the pixel/sample values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

A coding standard may include a sub-bitstream extraction process, and such is specified for example in SVC, MVC, and HEVC. The sub-bitstream extraction process relates to converting a bitstream by removing NAL units to a sub-bitstream. The sub-bitstream still remains conforming to the standard. For example, in a draft HEVC standard, the bitstream created by excluding all VCL NAL units having a temporal_id greater than a selected value and including all other VCL NAL units remains conforming. In another version of the a draft HEVC standard, the sub-bitstream extraction process takes a TemporalId and/or a list of LayerId values as input and derives a sub-bitstream (also known as a bitstream subset) by removing from the bitstream all NAL units with TemporalId greater than the input TemporalId value or layer_id value not among the values in the input list of LayerId values.

In a draft HEVC standard, the operation point the decoder uses may be set through variables TargetDecLayerIdSet and HighestTid as follows. The list TargetDecLayerIdSet, which specifies the set of values for layer_id of VCL NAL units to be decoded, may be specified by external means, such as decoder control logic. If not specified by external means, the list TargetDecLayerIdSet contains one value for layer_id, which indicates the base layer (i.e. is equal to 0 in a draft HEVC standard). The variable HighestTid, which identifies the highest temporal sub-layer, may be specified by external means. If not specified by external means, HighestTid is set to the highest TemporalId value that may be present in the coded video sequence or bitstream, such as the value of sps_max_sub_layers_minus1 in a draft HEVC standard. The sub-bitstream extraction process may be applied with TargetDecLayerIdSet and HighestTid as inputs and the output assigned to a bitstream referred to as BitstreamToDecode. The decoding process may operate for each coded picture in BitstreamToDecode.

Figure 9:
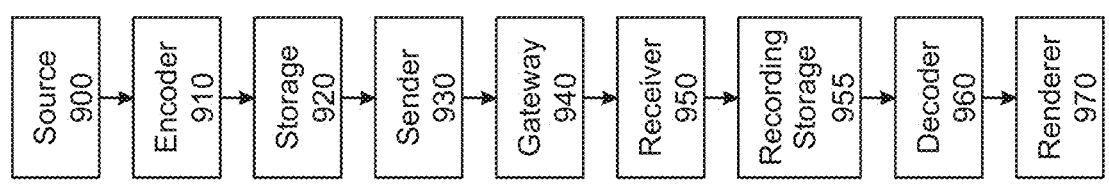
FIG. 9 is a graphical representation of a generic multimedia communication system.

FIG. 9 is a graphical representation of a generic multimedia communication system within which various embodiments may be implemented. As shown in FIG. 9, a data source 900 provides a source signal in an analog, uncompressed digital, or compressed digital format, or any combination of these formats. An encoder 910 encodes the source signal into a coded media bitstream. It should be noted that a bitstream to be decoded can be received directly or indirectly from a remote device located within virtually any type of network. Additionally, the bitstream can be received from local hardware or software. The encoder 910 may be capable of encoding more than one media type, such as audio and video, or more than one encoder 910 may be required to code different media types of the source signal. The encoder 910 may also get synthetically produced input, such as graphics and text, or it may be capable of producing coded bitstreams of synthetic media. In the following, only processing of one coded media bitstream of one media type is considered to simplify the description. It should be noted, however, that typically multimedia services comprise several streams (typically at least one audio and video stream). It should also be noted that the system may include many encoders, but in FIG. 9 only one encoder 910 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 920. The storage 920 may comprise any type of mass memory to store the coded media bitstream. The format of the coded media bitstream in the storage 920 may be an elementary self-contained bitstream format, or one or more coded media bitstreams may be encapsulated into a container file. If one or more media bitstreams are encapsulated in a container file, a file generator (not shown in the figure) may used to store the one more more media bitstreams in the file and create file format metadata, which is also stored in the file. The encoder 910 or the storage 920 may comprise the file generator, or the file generator is operationally attached to either the encoder 910 or the storage 920. Some systems operate "live", i.e. omit storage and transfer coded media bitstream from the encoder 910 directly to the sender 930. The coded media bitstream is then transferred to the sender 930, also referred to as the server, on a need basis. The format used in the transmission may be an elementary self-contained bitstream format, a packet stream format, or one or more coded media bitstreams may be encapsulated into a container file. The encoder 910, the storage 920, and the server 930 may reside in the same physical device or they may be included in separate devices. The encoder 910 and server 930 may operate with live real-time content, in which case the coded media bitstream is typically not stored permanently, but rather buffered for small periods of time in the content encoder 910 and/or in the server 930 to smooth out variations in processing delay, transfer delay, and coded media bitrate.

The server 930 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 930 encapsulates the coded media bitstream into packets. For example, when RTP is used, the server 930 encapsulates the coded media bitstream into RTP packets according to an RTP payload format. Typically, each media type has a dedicated RTP payload format. It should be again noted that a system may contain more than one server 930, but for the sake of simplicity, the following description only considers one server 930.

If the media content is encapsulated in a container file for the storage 920 or for inputting the data to the sender 930, the sender 930 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The server 930 may or may not be connected to a gateway 940 through a communication network. The gateway 940, which may also or alternatively be referred to as a middle box or a media-aware network element (MANE), may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 940 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 940 may be called an RTP mixer or an RTP translator and may act as an endpoint of an RTP connection. There may be zero to any number of gateways in the connection between the sender 930 and the receiver 950.

The system includes one or more receivers 950, typically capable of receiving, de-modulating, and/or de-capsulating the transmitted signal into a coded media bitstream. The coded media bitstream is transferred to a recording storage 955. The recording storage 955 may comprise any type of mass memory to store the coded media bitstream. The recording storage 955 may alternatively or additively comprise computation memory, such as random access memory. The format of the coded media bitstream in the recording storage 955 may be an elementary self-contained bitstream format, or one or more coded media bitstreams may be encapsulated into a container file. If there are multiple coded media bitstreams, such as an audio stream and a video stream, associated with each other, a container file is typically used and the receiver 950 comprises or is attached to a container file generator producing a container file from input streams. Some systems operate "live," i.e. omit the recording storage 955 and transfer coded media bitstream from the receiver 950 directly to the decoder 960. In some systems, only the most recent part of the recorded stream, e.g., the most recent 10-minute excerption of the recorded stream, is maintained in the recording storage 955, while any earlier recorded data is discarded from the recording storage 955.

The coded media bitstream is transferred from the recording storage 955 to the decoder 960. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 955 or a decoder 960 may comprise the file parser, or the file parser is attached to either recording storage 955 or the decoder 960.

The coded media bitstream may be processed further by a decoder 960, whose output is one or more uncompressed media streams. Finally, a renderer 970 may reproduce the uncompressed media streams with a loudspeaker or a display, for example. The receiver 950, recording storage 955, decoder 960, and renderer 970 may reside in the same physical device or they may be included in separate devices.

In a scalable extension of HEVC or any scalable extension for a single-layer coding scheme similar to HEVC, RAP pictures may be specified to have one or more of the following properties.

NAL unit type values of the RAP pictures with nuh_layer_id greater than 0 may be used to indicate enhancement layer random access points.

An enhancement layer RAP picture may be defined as a picture that enables starting the decoding of that enhancement layer when all its reference layers have been decoded prior to the EL RAP picture.

Inter-layer prediction may be allowed for CRA NAL units with nuh_layer_id greater than 0, while inter prediction is disallowed.

CRA NAL units need not be aligned across layers. In other words, a CRA NAL unit type can be used for all VCL NAL units with a particular value of nuh_layer_id while another NAL unit type can be used for all VCL NAL units with another particular value of nuh_layer_id in the same access unit.

BLA pictures have nuh_layer_id equal to 0.

IDR pictures may have nuh_layer_id greater than 0 and they may be inter-layer predicted while inter prediction is disallowed.

IDR pictures are present in an access unit either in no layers or in all layers, i.e. an IDR nal_unit_type indicates a complete IDR access unit where decoding of all layers can be started.

An STLA picture (STLA_W_DLP and STLA_N_LP) may be indicated with NAL unit types BLA_W_DLP and BLA_N_LP, respectively, with nuh_layer_id greater than 0. An STLA picture may be otherwise identical to an IDR picture with nuh_layer_id greater than 0 but needs not be aligned across layers.

After a BLA picture at the base layer, the decoding of an enhancement layer is started when the enhancement layer contains a RAP picture and the decoding of all of its reference layers has been started.

When the decoding of an enhancement layer starts from a CRA picture, its RASL pictures are handled similarly to RASL pictures of a BLA picture.

Layer down-switching or unintentional loss of reference pictures is identified from missing reference pictures, in which case the decoding of the related enhancement layer continues only from the next RAP picture on that enhancement layer.

In the following some details of an adaptive resolution change (ARC) use-cases are described in more detail using the scalable video coding framework. As scalable video coding inherently includes mechanisms for resolution change, the adaptive resolution change could efficiently be supported as indicated in FIG. 7.

Figure 7:
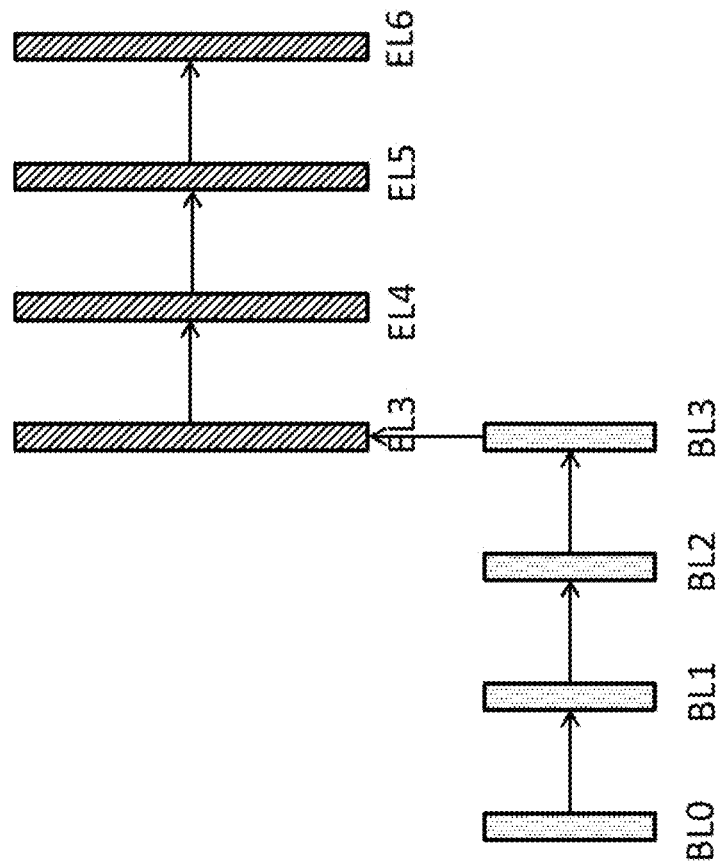
FIG. 7 depicts an example of a picture stream with a resolution change.

In the example of FIG. 7, switching happens at picture 3 and the decoder receives the bitstream with following pictures: BL0-BL1-BL2-BL3-EL3-EL4-EL6-EL6 . . . . Pictures BL0-BL3 are pictures of a base layer and pictures EL3-EL6 . . . are pictures of an enhancement layer. In this example pictures BL0-BL3 and EL4-EL6 use only intra layer prediction but the picture EL3 may also use inter layer prediction.

In some example implementations a sequence level signaling may be used to indicate the decoder if there is a resolution change in the bitstream. This may be performed e.g. by using two flags or other indicators at a sequence level. These flags may be called as inter_layer_pred_for_el_rap_only_flag and single_layer_for_non_rap_flag. The inter_layer_pred_for_el_rap_only_flag may be placed in a video parameter set VPS, indicating that only random access pictures (RAP) in the enhancement layer may utilize inter-layer prediction and that non-RAP pictures in the enhancement layer never utilize inter-layer prediction. The single_layer_for_non_rap_flag may be used to signal that a coded video sequence is constrained to perform the adaptive resolution change operation. The single_layer_for_non_rap_flag specifically indicates that, except for switching pictures, each AU in the sequence contains a single picture from a single layer (which may or may not be BL picture); and that access units where switching happens include pictures from two layers and inter-layer scalability tools may be used.

Indicating these restrictions in VPS allows the decoder to know that scalability is not used except for achieving resolution change, so that the decoder resources can be allocated accordingly upon a session start. In addition, an SHVC decoder may need to know that some access units do not necessarily contain BL pictures. This may be useful for the following case. Let's assume that an SHVC decoder has the capability to decode a lower resolution bitstream (e.g. 720p). If the adaptive resolution change is used and switching happens from 720p to 1080p, there should be a mechanism to indicate the decoder that it won't be able to decode and display all the pictures in the received bitstream.

One reason for separating the functionality in two flags is that an encoder might originally send two layers for all access units, but a middle-box could trim the bitstream differently for multiple recipients. For example, the middle-box could send base layer only for some recipients, the adaptive resolution change capable bitstream for some recipients, and both layers for some recipients. In this case, the encoder might set the inter_layer_pred_for_el_rap_only_flag to 1 and the single_layer_for_non_rap_flag to 0. If the middle-box trims this scalable bitstream to the adaptive resolution change capable bitstream then the middle-box might set the single_layer_for_non_rap_flag equal to 1 for the corresponding bitstream. In some embodiments, the middle-box obtains the capabilities and/or preferences and/or mode selection (e.g. selection of coding profile and level) of a receiver and trips the forwarded stream accordingly. The capabilities and/or preferences and/or mode selection may be obtained for example through an SDP offer/answer mechanism or may be received from a server that has information on capabilities and/or preferences and/or mode selection for a particular receiver and/or particular equipment in use in the receiver.

Similarly to the example above for a middle-box, a player or a decoder may also receive two or more layers for all access units, but may decide which spatial resolution is decoded based on, for example, available computational resources and/or available memory and/or display window size. The player and/or the decoder may remove unnecessary coded pictures from the bitstream, not needed for decoding, either prior to the decoding process or as a part of the decoding process. For example, if the resolution for the enhancement layer is desired as output of the decoder and inter_layer_pred_for_el_rap_only_flag is equal to 1, the pictures at the base layer may be removed subsequent to the EL RAP picture that is next in the decoding order.

When the single_layer_for_non_rap_flag is equal to 1, the entity that has created the bitstream, such as the encoder, the middle-box or the player, may configure the base layer pictures in access units also containing an EL RAP picture not to be output, for example by assigning such base layer pictures with output_flag or a similar indication equal to 0.

In some embodiments the middle-box may be a network element which receives an encoded bitstream from an encoder and sends the bitstream and/or a modified version of the bitstream to one or more recipients.

An example of a vps_extension syntax is described below:

|  | Descriptor |
|---|---|
| vps_extension( ) { | |
| ... | |
| for( i = 1; i <= vps_max_layers_minus1; i++ ) { | |
| // layer dependency | |
| num_direct_ref_layers[ i ] | u(6) |
| for( j = 0; j < num_direct_ref_layers[ i ]; j++ ) { | |
| ref_layer_id[ i ][ j ] | u(6) |
| } | |
| } | |
| inter_layer_pred_for_el_rap_only_flag | u(1) |
| single_layer_for_non_rap_flag | u(1) |
| } | | inter_layer_pred_for_el_rap_only_flag equal to 1 indicates that any non-RAP picture with layer_id greater than 0 does not use inter-layer prediction. inter_layer_pred_for_el_rap_only_flag equal to 0 indicates that any non-RAP picture with layer_id greater than 0 may or may not use inter-layer prediction.

When inter_layer_pred_for_el_rap_only_flag is equal to 1, num_direct_ref_layers[layerId] and ref_layer_id[layerId][j] apply to RAP pictures with layer_id equal to layerId, while non-RAP pictures with layer_id equal to layerId do not actually use the layers indicated by ref layer_id[layerId][j] for inter-layer prediction.

single_layer_for_non_rap_flag equal to 1 indicates either that all the VCL NAL units in an access unit have the same layer_id value or that two layer_id values are used by the VCL NAL units in an access unit and the picture with the greater layer_id value is a RAP picture. single_layer_for_non_rap_flag equal to 0 indicates that layer_id values may or may not be constrained beyond constraints possibly specified in other parts.

The above functionality could be implemented alternatively by introducing a new NAL unit type for an enhancement layer, which may be called as Rate Quality Layer Access (RQLA). The EL picture indicated to be applicable for the adaptive resolution change may be abbreviated RQLA. An RQLA picture may only utilize intra-picture prediction and inter-layer prediction and does not use inter prediction (i.e. temporal prediction). Instead of or in addition to potential sequence-level signaling constraining the pictures following a RQLA picture in the same enhancement layer may be constrained for example as follows: Any picture following the RQLA picture in display order may have these two constraints: i) no dependency on any other picture in the same layer that precedes the RQLA picture in display order and ii) no inter-layer prediction for non-RAP pictures. Alternatively or in addition, constraints may be relative to decoding order: Any picture following the RQLA picture in decoding order may have these two constraints: i) no dependency on any other picture in the same layer that precedes the RQLA picture in decoding order and ii) no inter-layer prediction for non-RAP pictures.

This could be indicated, for example, as follows. When the current picture is an RQLA picture, only inter-layer prediction is used and no temporal prediction is utilized. When the current picture is a picture that follows, in display order, an RQLA picture that has LayerId equal to that of the current picture, there shall be no picture included in RefPicSetStCurrBefore, RefPicSetStCurrAfter or RefPicSetLtCurr that preceded the RQLA picture in display order. When the current picture is a picture that follows, in display order, an RQLA picture that has LayerId equal to that of the current picture, inter-layer prediction is not utilized.

An RQLA picture may be regarded as a RAP picture (in an enhancement layer).

A decoding operation including the decoding for an RQLA picture may be specified as follows.

When the current picture has nuh_layer_id equal to 0, the following applies:
  When the current picture is a CRA picture that is the first picture in the bitstream or an IDR picture or a BLA picture, the variable LayerInitialisedFlag[0] is set equal to 1 and the variable LayerInitialisedFlag[i] is set equal to 0 for all values of i from 1 to 63, inclusive.
  The decoding process for a base layer picture is applied, e.g. according to the HEVC specification.

When the current picture has nuh_layer_id greater than 0, the following applies for the decoding of the current picture CurrPic. The following ordered steps (in their entirety or a subset thereof) specify the decoding processes using syntax elements in the slice segment layer and above:
  Variables relating to picture order count are set equal to the same values as for the picture with nuh_layer_id equal to 0 in the same access unit.
  The decoding process for reference picture set (e.g. as described earlier), wherein reference pictures may be marked as "unused for reference" or "used for long-term reference" (which only needs to be invoked for the first slice segment of a picture).
  When CurrPic is an IDR picture, LayerInitialisedFlag[nuh_layer_id] is set equal to 1.
  When CurrPic is one of a CRA picture, a STLA picture or an RQLA picture, and Layerinitialised[nuh_layer_id] is equal to 0 and LayerInitialisedFlag[refLayerId] is equal to 1 for all values of refLayerId equal to ref_layer_id[nuh_layer_id][j], where j is in the range of 0 to num_direct_ref_layers[nuh_layer_id]−1, inclusive, the following applies:
    LayerInitialisedFlag[nuh_layer_id] is set equal to 1.
    When CurrPic is a CRA picture, the decoding process for generating unavailable reference pictures may be invoked.
  LayerInitialisedFlag[nuh_layer_id] is set equal to 0, when all of the following are true:
    CurrPic is a non-RAP picture.
    LayerInitialisedFlag[nuh_layer_id] is equal to 1.
    One or more of the following is true:
      Any value of RefPicSetStCurrBefore[i] is equal to "no reference picture", with i in the range of 0 to NumPocStCurrBefore−1, inclusive.
      Any value of RefPicSetStCurrAfter[i] is equal to "no reference picture", with i in the range of 0 to NumPocStCurrAfter−1, inclusive.
      Any value of RefPicSetLtCurr[i] is equal to "no reference picture", with i in the range of 0 to NumPocLtCurr−1, inclusive.
  When LayerInitialisedFlag[nuh_layer_id] is equal to 1, slices of the picture are decoded. When LayerInitialisedFlag[nuh_layer_id] is equal to 0, slices of the picture are not decoded.
  PicOutputFlag (controlling picture output; when 0 the picture is not output by the decoder, when 1 the picture is output by the decoder, unless subsequently canceled e.g. by an IDR picture with no_output_of_prior_pics_flag equal to 1 or a similar command) is set as follows:
    If LayerInitialisedFlag[nuh_layer_id] is equal to 0, PicOutputFlag is set equal to 0.
    Otherwise, if the current picture is a RASL picture and the previous RAP picture with the same nuh_layer_id in decoding order is a CRA picture and the value of LayerInitialisedFlag[nuh_layer_id] was equal to 0 at the start of the decoding process of that CRA picture, PicOutputFlag is set equal to 0.
    Otherwise, PicOutputFlag is set equal to pic_output_flag.
  At the beginning of the decoding process for each P or B slice, the decoding process for reference picture lists construction is invoked for derivation of reference picture list 0 (RefPicList0), and when decoding a B slice, reference picture list 1 (RefPicList1).
  After all slices of the current picture have been decoded, the following applies:
    The decoded picture is marked as "used for short-term reference".
    If TemporalId is equal to HighestTid, the marking process for non-reference pictures not needed for inter-layer prediction is invoked with latestDecLayerId equal to nuh_layer_id as input.

The indications could be implemented alternatively or additionally as follows. The two flags presented above are provided as example embodiments, while it needs to be understood that other embodiments for the encoder to indicate and for the decoder to conclude the use of various embodiments of the invention are also possible. For example, instead of or in addition to the inter_layer_pred_for_el_rap_only_flag, the video parameter set and/or any other syntax structure containing the one or more indications may include two loops for indicating the reference layer, one for non-RAP pictures having layer_id equal to i and another one for RAP pictures having layer_id equal to i. In another example, instead of or in addition to single_layer_for_non_rap_flag, the layer_id values that are present in access units may be indicated.

The one or more indications could be placed for example in an SEI message or a sequence parameter set or any other syntax structure.

The indication could refer to an encoding method where only intra picture samples from base layer are used (decoded syntax element values of the base layer are not used for inter-layer prediction). This may be particularly useful for standard scalability scenario where base layer syntax might not be accessible for the enhancement layer decoder.

The adaptive resolution change concept could be useful e.g. for quality scalability, bit-depth scalability, spatial scalability and chroma format scalability use-cases.

The adaptive resolution change concept may also be applied when the input video to encoder and consequently the output of the decoder are frame-packed, e.g. contains a stereoscopic video presentation.

The adaptive resolution change concept may also be applied to multiview video coding, where views may be considered as layers in the description of the invention. inter_layer_pred_for_el_rap_only_flag equal to 1 therefore indicates that in the non-base views only RAP pictures may utilize inter-view prediction, while no prediction across views takes place to non-RAP pictures in non-base views. single_layer_for_non_rap_flag equal to 1 indicates that the coded video sequence contains a single view except when the viewpoint is switched. The access units where the viewpoint switching takes place contain two views, the switch-to view contains a RAP picture that may be inter-view predicted from the picture in the switch-from view.

The one or more indications could be indicated to be specific to a certain combination or combinations of one or more target layers (using inter-layer prediction) and one or more reference layers.

Switching to a lower resolution may be enabled for example in one or more of the following ways.

A picture in a lower-resolution layer may be coded as a RAP picture without inter-layer prediction. In the access unit where adaptive resolution upswitching is enabled or performed, the lower-resolution picture may be stored as a long-term reference picture. A resolution down-switching may be enabled at a later access unit by using the long-term picture as an inter prediction reference in the lower-resolution view. The encoder may adaptively choose between the modes above, for example on coding treeblock basis, and indicate the chosen mode in the bitstream. The decoder can decode the modes from the bitstream and hence replicate the adaptive selections determined by the encoder. A picture in a higher-resolution layer can be down-sampled and utilized for inter-layer prediction when reconstructing a RAP picture on a lower layer.

A so called Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP may be easier to configure and may be granted traversal of firewalls and network address translators (NAT). Hence, also HTTP may be applicable for multimedia streaming applications.

Streaming over HTTP may be used to send audio and video over HTTP from an ordinary web server for playback on client device(s). Streaming over HTTP may be used both for live broadcasts and prerecorded content (video on demand). Multiple alternate streams at different bit rates may be utilized, and the client software can switch between different streams e.g. if a network bandwidth changes. Streaming over may also provide for media encryption and user authentication over HTTPS, allowing content providers to protect their work e.g. against unauthorized utilization of the content.

Figure 15:
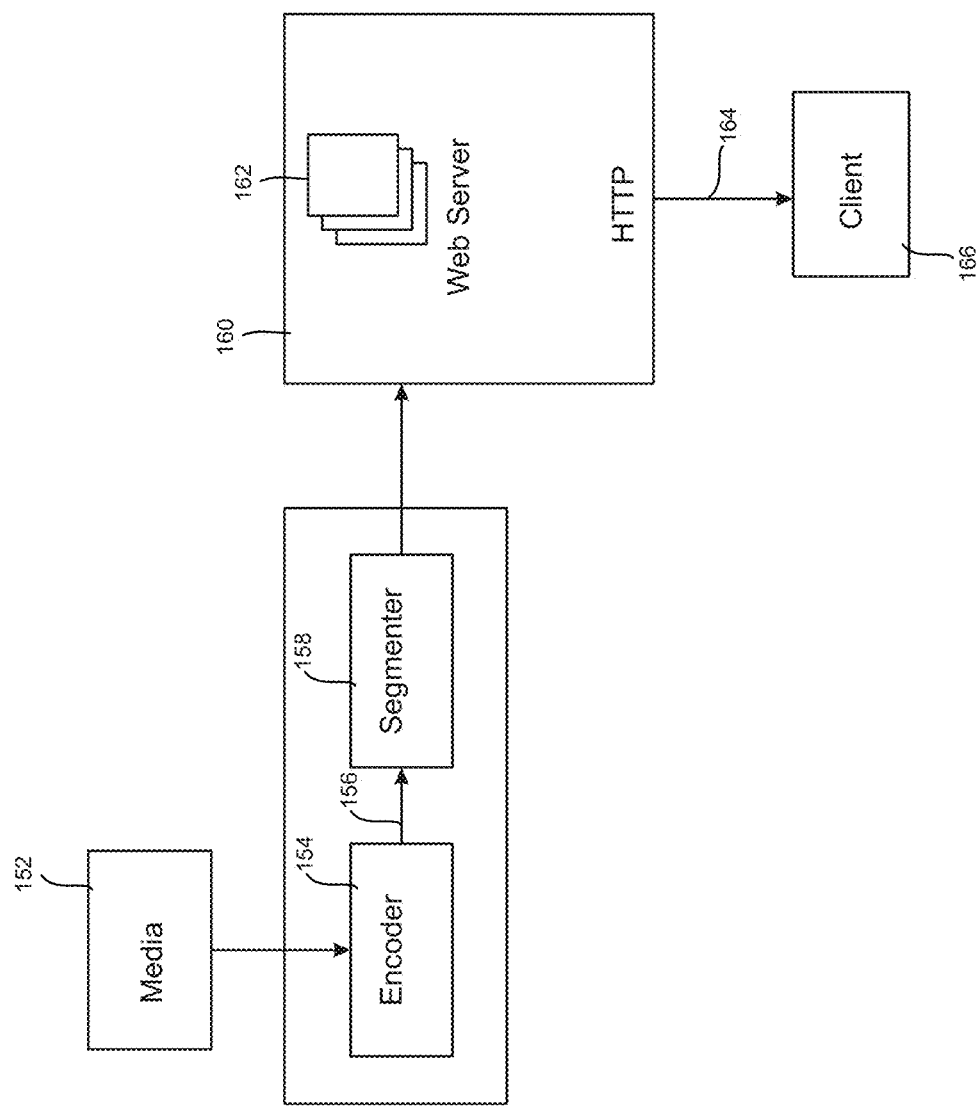
FIG. 15 depicts a simplified system for streaming over HTTP.

FIG. 15 depicts a simplified system for streaming over HTTP. The media 152 (e.g. audio, video, text) is encoded by a media encoder 154 to produce a transport stream 156. The transport stream 156 may be segmented into segments by a stream segmenter 158. The segments may be stored as separate files 162 or the segments may be generated from the transport stream 156 on request basis for example by executing a script in the web browser 160. The segments may be distributed 164 from a web server 160 within HTTP (response) messages responding to HTTP GET requests by the client 166. The receiving client 166 may then store the received segments and decode the media content from the segments.

In some embodiments the files containing the segments may be called as media segment files. They may contain audio and/or video and/or text of a certain period of time. For example, the period may be about 10 seconds, 15 second, or some other length. Each segment need not have the same duration but it may vary in different segments and/or in different embodiments.

There may also be provided an index file, or playlist, which may give the clients the locations (e.g. URLs) of the media segment files. The playlist may be periodically refreshed to accommodate live broadcasts, where media segment files may be constantly being produced.

In dynamic adaptive streaming over HTTP (DASH), the multimedia content may be captured and stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in single or multiple files. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Figure 14:
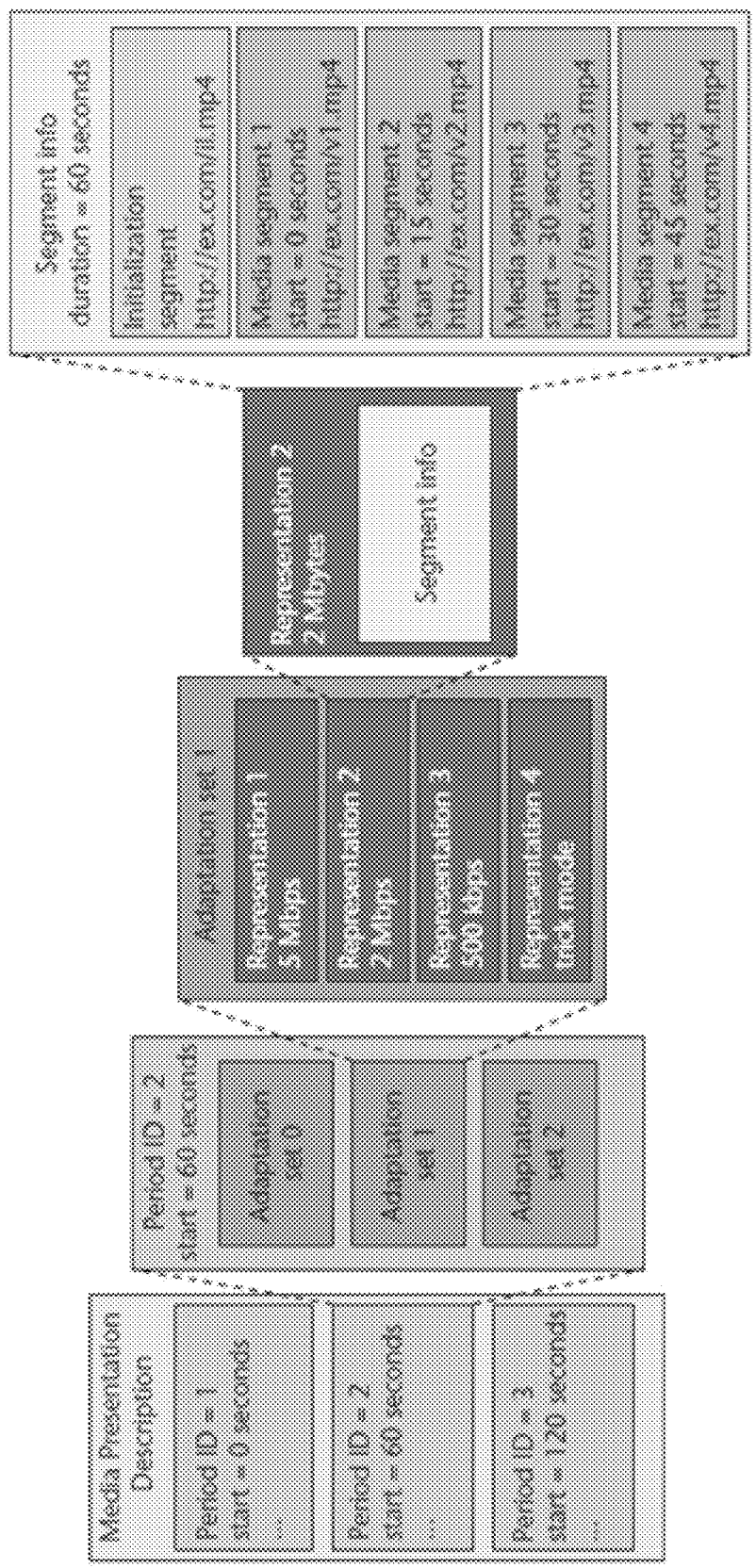
FIG. 14 depicts some details of some dynamic adaptive streaming over HTTP representations.

The media presentation description (MPD) may provide information for clients to establish a dynamic adaptive streaming over HTTP. MPD may contain information describing media presentation, such as an HTTP-uniform resource locator (URL) of each Segment to make GET Segment request. In DASH, hierarchical data model may be used to structure media presentation as shown in FIG. 14. A media presentation may comprise a sequence of one or more Periods, each Period may contain one or more Groups, each Group may contain one or more Adaptation Sets, each Adaptation Set may contain one or more Representations, and each Representation may comprise one or more Segments. A Representation is one of the alternative choices of the media content or a subset thereof which may differ by the encoding choice, e.g. by bitrate, resolution, language, codec, etc. The Segment may contain certain duration of media data, and metadata to decode and present the included media content. A Segment may be identified by a uniform resource indicator (URI) and can be requested by a HTTP GET request.

A DASH service may be provided as an on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments may be created continuously as the content is produced and published to DASH clients by a content provider. Segment URLs construction method may be either template-based Segment URLs construction method or the Segment list generation method. In the former, a DASH client may be able to construct Segment URLs without updating an MPD before requesting a Segment. In the latter, a DASH client may need to periodically download the updated MPDs to get Segment URLs. For live service, hence, the template-based Segment URLs construction method may be superior to the Segment list generation method.

A Media Segment may contain certain duration of media data for playback at a normal speed, such duration may be referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration may be a lower bound on the end-to-end latency perceived by a DASH client since a Segment is a discrete unit of generating media data for DASH. Content generation may be done in such a manner that a whole Segment of media data is made available for a server. Furthermore, many client implementations may use a Segment as the unit for GET requests. Thus, in some arrangements for live services a Segment can be requested by a DASH client only when the whole duration of Media Segment is available as well as encoded and encapsulated into a Segment. For on-demand service, different strategies of selecting Segment duration may be used.

A Segment may further be partitioned into Subsegments each of which may contain complete access units. Subsegments may be indexed by Segment index, which contains information to map presentation time range and byte range for each Subsegment and may be used to make a HTTP GET request for a specific Subsegment using byte range HTTP request. If relatively long Segment duration is used, then Subsegments may be used to keep the size of HTTP responses reasonable and flexible for bitrate adaptation.

Each media segment may be assigned a unique URL (possibly with byte range), an index, and explicit or implicit start time and duration. Each media segment may contain at least one stream access point, which is a random access or switch-to point in the media stream where decoding can start using only data from that point forward.

To enable downloading segments in multiple parts, a method of signaling subsegments using a segment index box may be utilized. This box describes subsegments and stream access points in the segment by signaling their durations and byte offsets. The DASH client may use the indexing information to request subsegments using partial HTTP GET requests. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay. MPEG-DASH defines segment-container formats for both ISO Base Media File Format and MPEG-2 Transport Streams.

DASH specifies different timelines including Media Presentation timeline and Segment availability times. The former indicates the presentation time of an access unit with a media content which is mapped to the global common presentation timeline. Media Presentation timeline may enable DASH to seamlessly synchronize different media components which are encoded with different coding techniques and share a common timeline. The latter indicates a wall-clock time and is used to signal clients the availability time of Segments which may be identified by HTTP URLs. A DASH client may be able to identify an availability time of a certain Segment by comparing the wall-clock time to the Segment availability time assigned to that Segment. Segment availability time may be used in live delivery of media Segments, referred as live service. For live service, the Segment availability time is different from Segment to Segment and a certain Segment's availability time may depend on the position of the Segment in the Media Presentation timeline. For on-demand service, the Segment availability time may be the same for all Segments.

DASH supports rate adaptation by dynamically requesting Media Segments and/or Subsegments from different Representations within an Adaptation Set to match varying network bandwidth. When a DASH client switches up/down Representation, coding dependencies within Representation may need to be taken into account. In media decoding, a Representation switch may only happen at a random access point (RAP), which may be used in video coding techniques such as H.264/AVC. In order to avoid requesting and transmitting of media data that will not be decoded, RAPs may be aligned at the beginning of Media Segments and/or Subsegments, and the MPD and/or the segment index box may be used to indicate alignment of RAPs at the beginning of Media Segments and/or Subsegments. Consequently, DASH clients may be able to conclude which Segments and/or Subsegments to request so that when Representation switching is performed the first Segment and/or Subsegment of a destination Representation starts with a RAP and the Segments and/or Subsegments of the source and destination Representation are aligned (time-wise). In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

A content provider may create Segment and Subsegment of multiple Representations in a way that may make switching simpler. In a simple case, each Segment and Subsegment starts with a SAP and the boundaries of Segment and Subsegment are aligned across the Representation of an Adaptation Set. In such a case a DASH client may be able to switch Representations without error drift by requesting Segments or Subsegments from an original Representation to a new Representation. In DASH, restrictions to construct Segment and Subsegment are specified in MPD and Segment Index in order to facilitate a DASH client to switch Representations without introducing an error drift. One of the usages of profile specified in DASH is to provide different levels of restrictions to construct Segment and Subsegment etc.

The DASH standard includes mechanisms to enable fast start-up of a media session. This may be done e.g. as follows. Video is divided into representations and each representation can be of different quality and resolution. Each representation may comprise segments that may last e.g. 60 seconds. FIG. 14 depicts some more details of some DASH representations. Each segment could start with a stream access point, where the pictures within the segment are coded without referencing to any other picture from a different segment. This way a DASH client may start with a lower bitrate representation than its average bandwidth and quickly fill its buffer, then it may switch to a segment of a higher resolution and continue the playback.

Inter-layer prediction may be utilized between the first picture with the higher spatial resolution within the segment and a lower spatial resolution picture. For example, the first picture with the higher spatial resolution may be inter-layer predicted using one or more of the last pictures with the lower spatial resolution. This may enable bit-rate savings compared to a situation in which the first picture with the higher resolution were intra-predicted or if it were an independently decodable picture.

Some embodiments may enable higher coding efficiency and shorter start-up times for DASH. It may also be possible to include less frequent IRAP pictures (and hence longer Segments or Subsegments), as the frequency of IRAP pictures need only to be selected to be sufficient for random access and bitrate scaling, while building the buffer occupancy level may be handled with using the ARC segments.

Figure 10:
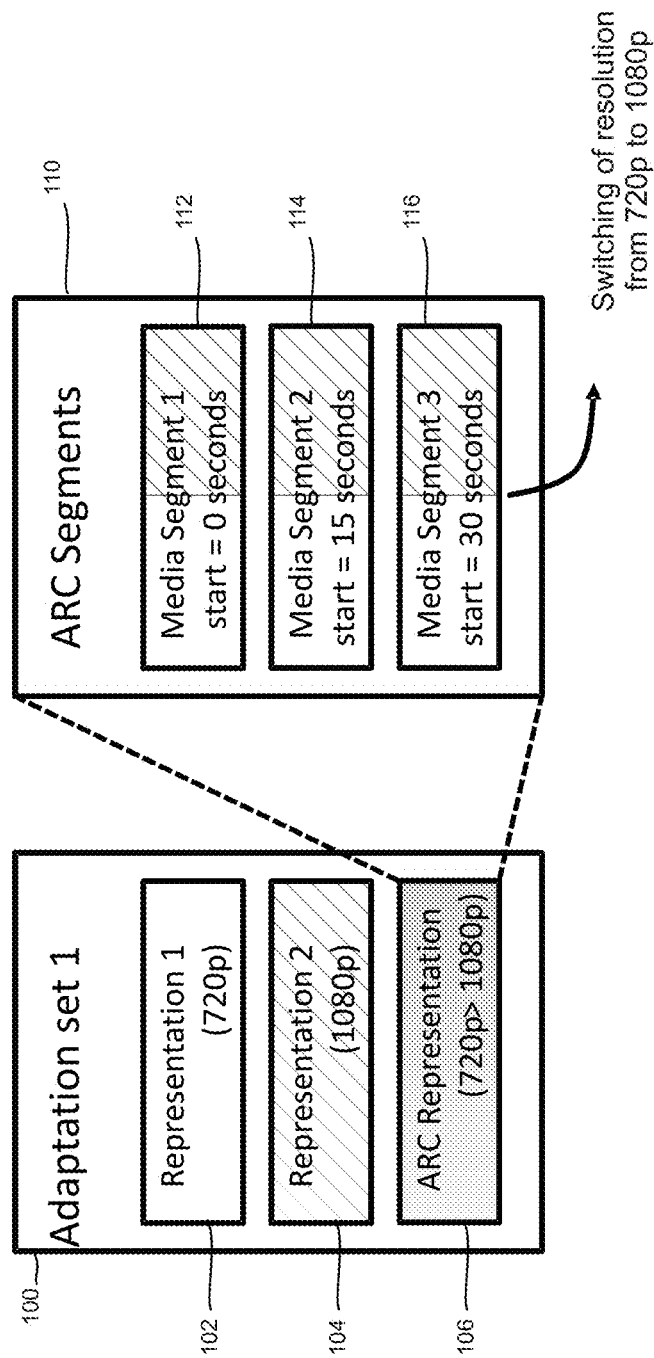
FIG. 10 illustrates an adaptive resolution change concept.

Improvement of the start-up time for DASH sessions may be achieved by utilizing the Scalable HEVC concept, more specifically the Adaptive Resolution Change (ARC) concept within the SHVC. SHVC allows transmitting a single layer bitstream except for the access unit where the resolution switching occurs. FIG. 7 illustrates the ARC concept of SHVC. In some embodiments a Representation within DASH (called ARC representation) with the following features may be utilized. An example of this is depicted in FIG. 10. The representation 100 may contain segments 102, 104, 106 starting with a smaller resolution (e.g. the segment 102 in FIG. 10), switching to a higher resolution (e.g. the segments 104 and 106 in FIG. 10) within the duration of the Segment and the Segment ends with a higher resolution; segments within the ARC representation may be coded with SHVC where single_layer_for_non_irap_flag (which is also called as single_layer_for_non_rap_flag in this specification) is true. This may mean that the higher resolution switching pictures use upsampled lower resolution pictures as a reference for prediction for improved coding efficiency.

The value of the single_layer_for_non_irap_flag may be set e.g. to 1 to indicate that the single_layer_for_non_irap_flag is true.

When performing resolution switching, a DASH client may fetch only one Segment of an ARC Representation and subsequently fetch the higher-resolution Segments.

In some embodiments, pictures in a Segment of the ARC Representation may be predicted from pictures of the previous Segment in the lower-resolution Representation. For example, with reference to FIG. 10, some 720p-resolution pictures in a Segment of the ARC Representation may be predicted from pictures of the previous Segment in Representation 1 (having resolution 720p). In some embodiments, Segments of the ARC Representation may start with SAP and hence may be coded and/or decoded independently of earlier Segments in any Representation.

In some embodiments, pictures in a Segment of a destination (higher-resolution) Representation may be predicted, in a DASH client, from picture of the previous Segment of the ARC Representation. For example with reference to FIG. 10, some 1080p-resolution pictures in a Segment of Representation 2 may be predicted, in a DASH client, from picture of the previous Segment in the ARC Representation. As the higher-resolution Representation has been encoded without using pictures of the ARC Representation as reference, there may be a drift in decoded sample values between the encoder and the DASH client operating in a way described in this paragraph. The drift may cease to exist when the next SAP of the higher-resolution Representation is decoded. In some embodiments, Segments of the higher-resolution Representation may start with SAP and may not predict from earlier Segments.

Figure 11:
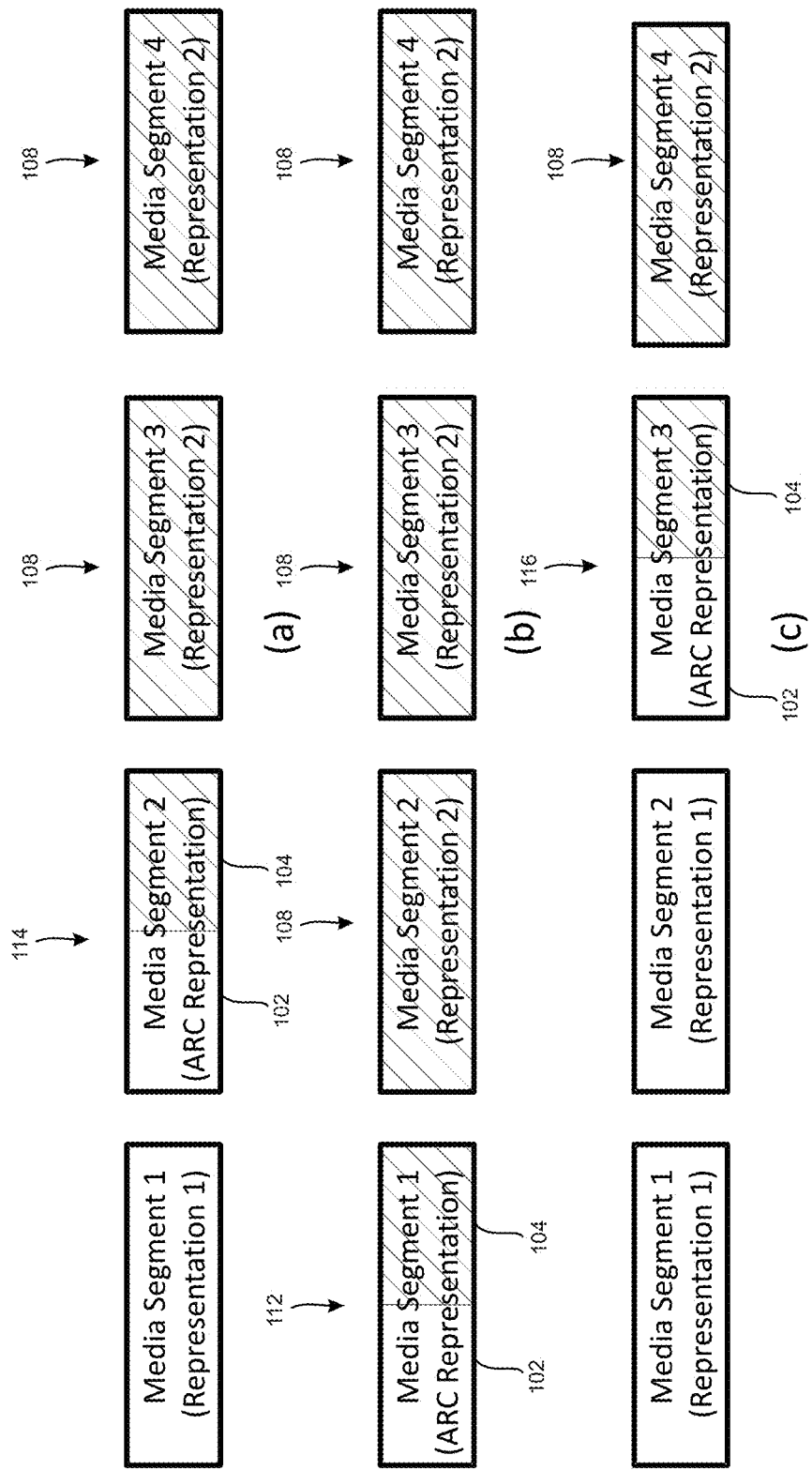
FIGS. 11a to 11c illustrate examples of resolution changes utilizing the adaptive resolution change concept.

The DASH client may perform the following operations for resolution switching using the ARC representation (see FIGS. 11a to 11c for illustration). After the session is initiated, the DASH client may estimate the available bandwidth, analyze the MPD and determine the appropriate resolution to start the session for fast start-up and optimal resolution to continue once the buffer of the client is relatively full. Based on these parameters, the client may request the appropriate segments within the appropriate representations. At the desired time of switching to higher resolution, the client may request the appropriate segment 112, 114, 116 from the ARC representation 110. In the example of FIG. 11a the segment 114 of FIG. 10 is used as the switching segment, in the example of FIG. 11b the segment 112 is used as the switching segment, and in the example of FIG. 11a the segment 116 is used as the switching segment. After the ARC segment 110 is requested and switching happens to higher resolution, the client may continue downloading higher resolution segments. These segments are illustrated with reference numeral 108 in FIGS. 11a to 11c. If the bandwidth of the client changes (for example increases), similar operations could be performed. The DASH client may determine resolution switching for example on the basis of the occupancy or duration of received and buffered media data that has not been decoded and/or played out yet.

Figure 13:
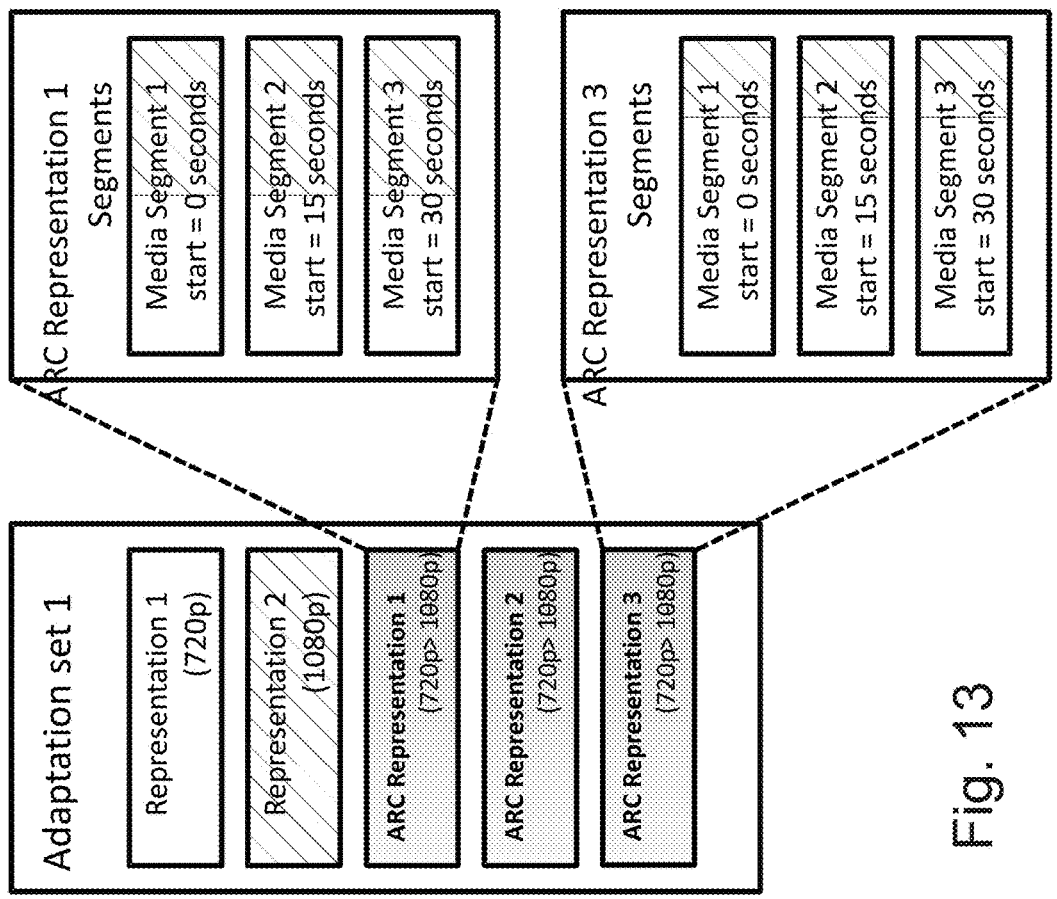
FIG. 13 illustrates examples of adaptive resolution change representations with different characteristics.

If more than two resolutions are present in the Adaptation Set, a separate ARC Representation could be used to switch between each Representation. FIG. 12a depicts an example of such adaptation set. FIG. 12b illustrates switching from a lower resolution (720p in this example) to a higher resolution (1080p in this example) using representations 1 and 2 of the adaptation set of FIG. 12a and switching further to a still higher resolution (4K×2K in this example) using representation 3. Respectively, FIG. 12c illustrates switching from a lower resolution (720p in this example) to a higher resolution (1080p in this example) using representations 1, 2 and 3 of the adaptation set of FIG. 12a. In addition, different ARC representations with different characteristics (such as switching point occurring at different points) can be utilized in the Adaptation Set. Some examples of this are depicted in FIG. 13.

Some implementations and various alternatives are described below. The segments used for switching may be collected and included in a separate Representation. The following attributes may be used for this representation: A @startWidth attribute may specify the horizontal visual presentation size of the beginning pictures of the video segments; a @startHeight tribute may specify the vertical visual presentation size of the beginning pictures of the video segments; and a @switchPoint tribute may specify the switching point where the resolution changes from the resolution specified with (@startWidth, @startHeight) to (@width, @height).

It should be noted that the above description assumes the semantics of the attributes @width, @height is modified to correspond to the picture sizes at the end of the segment for this Representation. However, this is a minor implementation detail and other alternatives could be used as well.

The above could be implemented in an example MPD e.g. as follows. In this example, Representation id=3 is the proposed Representation holding the ARC segments. In this example there are some additional attributes and the value of the bandwidth parameter is lower than Representation 2 as the Segments of Representation 3 starts with a lower resolution.

playout begins after @minBufferTime*@bandwidth bits have been received (i.e. at time @minBufferTime after the first bit is received).

A DASH client may receive and interpret the information on the initial buffering requirements related to ARC representations. The client may estimate the available bitrate and/or have other means to determine an expected available bitrate. The client may determine that the expected available bitrate suits the higher-resolution (e.g. 1080p) but that the Representation of 1080p might require a long initial buff-

```
<?xml version="1.0" encoding="UTF-8"?>
<MPD
    xmlns:xsl="http://www.w3.org/2001/XMLSchema-instance"
    xmlns="urn:mpeg:dash:schema:mpd:2011"
    xsl.schemaLocation="urn:mpeg:dash:schema:mpd:2011 DASH-MPD.xsd"
    type="static"
    mediaPresentationDuration="PT3256S"
    minBufferTime="PT1.2S"
    profiles="urn:mpeg:dash:profile:isoff-on-demand:2011">
    <BaseURL>http://cdn1.example.com/</BaseURL>
    <BaseURL>http://cdn2.example.com/</BaseURL>
    <Period>
         <!-- Video -->
      <AdaptationSet mimeType="video/mp4" codecs="avc1.4d0228" subsegmentAlignment="true" subsegmentStartsWithSAP="2">
         <ContentProtection schemeIdUrl="urn:uuid:706D6953-656C-5244-4D48-656164657221"/>
         <Representation id="1" bandwidth="1384000" width="640" height "480">
            <BaseURL>41325645.mp4</BaseURL>
         </Representation>
         <Representation id="2" bandwidth="1536000" width="1280" height="720">
            <BaseURL>89045625.mp4</BaseURL>
         </Representation>
         <Representation id="3" bandwidth="1384000" width="1280" height="720" startWidth="640" startHeight="480">
            <BaseURL>89045625.mp4</BaseURL>
         </Representation>
      </AdaptationSet>
   </Period>
</MPD>
```

MPD or any other manifest may include information on the initial buffering requirements for a Representation. For example, in MPD attributes @minBufferTime and @bandwidth characterize the initial buffering requirements. Their semantics may be defined as follows: Consider a hypothetical constant bitrate channel of bandwidth with the value of @bandwidth attribute in bits per second (bps). Then, if the Representation is continuously delivered at this bitrate, starting at any SAP that is indicated either by @ startWithSAP or by any Segment Index box, a client can be assured of having enough data for continuous playout providing playout begins after @minBufferTime*@bandwidth bits have been received (i.e. at time @minBufferTime after the first bit is received).

For ARC representations, the information on the initial buffering requirements may be defined to concern a sequence of Segments where the first Segment is an ARC Segment (e.g. from 720p to 1080p resolution) and the following Segments are of the higher-resolution (e.g. 1080p). For example, @minBufferTime and @bandwidth may be specified as follows for ARC Representations: Consider a hypothetical constant bitrate channel of bandwidth with the value of @bandwidth attribute in bits per second (bps). Then, if the first Segment of this (ARC) Representation is followed by a sequence of Segments of the destination Representation and all these Segments are continuously delivered at this bitrate, starting at any SAP that is indicated either by @ startWithSAP, a client can be assured of having enough data for continuous playout providing ering time. The client may therefore request a Segment of the ARC Representation followed by a higher-resolution Segments.

In some embodiments it may be possible to use a different representation that solely includes segments used for switching from one resolution to another. Moreover, similar operations can also be implemented in alternative ways e.g. as follows. Switching to a different resolution could also happen between segments, but not within a segment. For example, the first segment within the ARC representation could be of HD resolution and second segment of the ARC representation could be of UHD resolution. In that case the first picture of the second segment might depend on the last picture of the first segment. This can be arranged e.g. by allowing an overlap between the Segments (i.e. the lower resolution Segment may last one picture longer than the co-timed higher resolution Segment).

It needs to be understood that while embodiments have been described with reference to Segments, the embodiments can be similarly realized with reference to Subsegments instead or in addition.

It needs to be understood that while embodiments have been described with reference to DASH and/or MPD, the embodiments can be similarly realized with reference to any streaming over HTTP or similar protocol and/or any manifest format.

Figure 4A:
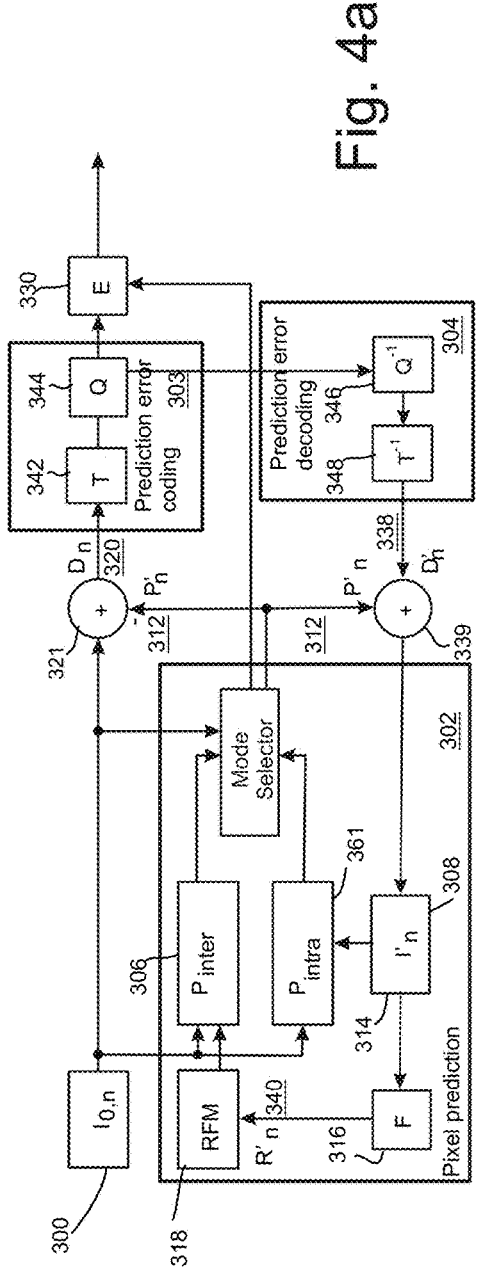
FIG. 4a shows schematically an embodiment of an encoder.

FIG. 4a shows a block diagram for video encoding and decoding according to an example embodiment. In this embodiment the encoder comprises a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. In this embodiment the mode selector 310 comprises a block processor 381 and a cost evaluator 382. The encoder may further comprise an entropy encoder 330 for entropy encoding the bit stream.

Figure 4B:
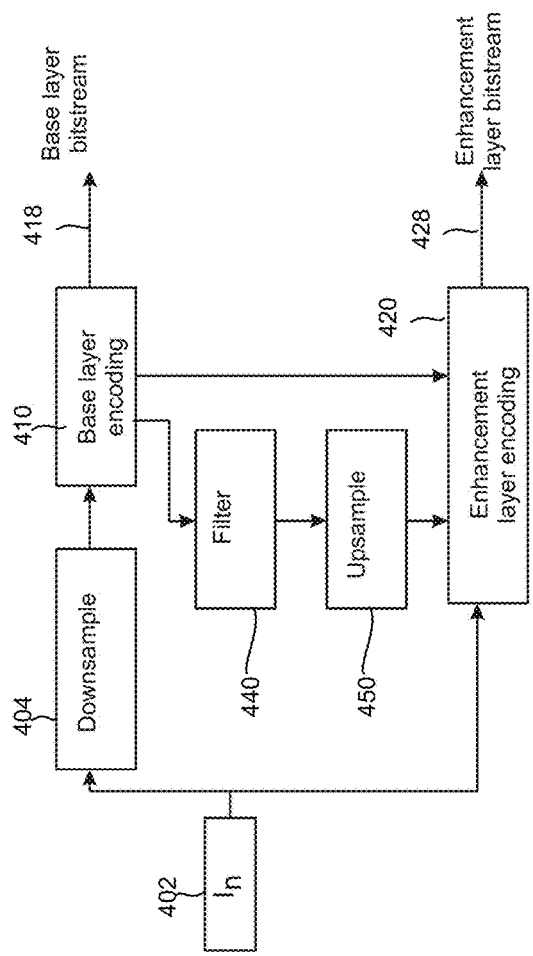
FIG. 4b shows schematically an embodiment of a spatial scalability encoding apparatus according to some embodiments.

FIG. 4b depicts an embodiment of a spatial scalability encoding apparatus 400 comprising a base layer encoding element 410 and an enhancement layer encoding element 420. The base layer encoding element 410 encodes the input video signal 402 to a base layer bitstream 418 and, respectively, the enhancement layer encoding element 420 encodes the input video signal 402 to an enhancement layer bitstream 428. The spatial scalability encoding apparatus 400 may also comprise a downsampler 404 for downsampling the input video signal if the resolution of the base layer representation and the enhancement layer representation differ from each other. For example, the scaling factor between the base layer and an enhancement layer may be 1:2 wherein the resolution of the enhancement layer is twice the resolution of the base layer (in both horizontal and vertical direction).

The base layer encoding element 410 and the enhancement layer encoding element 420 may comprise similar elements with the encoder depicted in FIG. 4a or they may be different from each other.

The base layer encoding element 410 encodes frames of the input video signal e.g. as follows, with reference to the encoder of FIG. 4a. The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of a current frame or picture). The output of both the inter-predictor and the intra-predictor are passed to the mode selector 310. Both the inter-predictor 306 and the intra-predictor 308 may have more than one intra-prediction modes. Hence, the inter-prediction and the intra-prediction may be performed for each mode and the predicted signal may be provided to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode it will pass the output of one of the intra-predictor modes to the output of the mode selector 310.

The mode selector 310 may use, in the cost evaluator block 382, for example Lagrangian cost functions to choose between coding modes and their parameter values, such as motion vectors, reference indexes, and intra prediction direction, typically on block basis. This kind of cost function may use a weighting factor lambda to tie together the (exact or estimated) image distortion due to lossy coding methods and the (exact or estimated) amount of information that is required to represent the pixel values in an image area: C=D+lambda×R, where C is the Lagrangian cost to be minimized, D is the image distortion (e.g. Mean Squared Error) with the mode and their parameters, and R the number of bits needed to represent the required data to reconstruct the image block in the decoder (e.g. including the amount of data to represent the candidate motion vectors).

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to the filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations. In many embodiments the reference frame memory 318 may be capable of storing more than one decoded picture, and one or more of them may be used by the inter-predictor 306 as reference pictures against which the future images 300 are compared in inter prediction operations. The reference frame memory 318 may in some cases be also referred to as the Decoded Picture Buffer.

In many embodiments the reference frame memory 318 may be capable of storing decoded pictures of different layers or there may be different reference frame memories for storing decoded pictures of different layers.

The operation of the pixel predictor 302 may be configured to carry out any pixel prediction algorithm.

The pixel predictor 302 may also comprise a filter 385 to filter the predicted values before outputting them from the pixel predictor 302.

The filter 316 may be used to reduce various artifacts such as blocking, ringing etc. from the reference images.

The filter 316 may comprise e.g. a deblocking filter, a Sample Adaptive Offset (SAO) filter and/or an Adaptive Loop Filter (ALF). In some embodiments the encoder determines which region of the pictures are to be filtered and the filter coefficients based on e.g. RDO and this information is signalled to the decoder.

When performing the adaptive resolution change the base layer encoding element 410 may provide information on base layer coded data (or some enhancement layer data) such as motion information and information on block partitioning to the enhancement layer encoding element 420. The enhancement layer encoding element 420 may use this data to determine which reference frames have been used in constructing the base layer data, wherein the same reference frames may be used when performing motion prediction of the current block on the enhancement layer. This operation may, for example, be performed when encoding the figure EL3 of FIG. 7.

When the enhancement layer encoding element 420 is encoding a region of an image of an enhancement layer (e.g. a CTU), it determines which region in the base layer corresponds with the region to be encoded in the enhancement layer. For example, the location of the corresponding region may be calculated by scaling the coordinates of the CTU with the spatial resolution scaling factor between the base and enhancement layer. The enhancement layer encoding element 420 may also examine if the sample adaptive offset filter and/or the adaptive loop filter should be used in encoding the current CTU on the enhancement layer. If the enhancement layer encoding element 420 decides to use for this region the sample adaptive filter and/or the adaptive loop filter, the enhancement layer encoding element 420 may also use the sample adaptive filter and/or the adaptive loop filter to filter the sample values of the base layer when constructing the reference block for the current enhancement layer block. When the corresponding block of the base layer and the filtering mode has been determined, reconstructed samples of the base layer are then e.g. retrieved from the reference frame memory 318 and provided to the filter 440 for filtering. If, however, the enhancement layer encoding element 420 decides not to use for this region the sample adaptive filter and the adaptive loop filter, the enhancement layer encoding element 420 may also not use the sample adaptive filter and the adaptive loop filter to filter the sample values of the base layer.

If the enhancement layer encoding element 420 has selected the SAO filter, it may utilize the SAO algorithm presented above.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a macroblock filter which may filter the reconstructed macroblock according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

In some embodiments the filter 440 comprises the sample adaptive filter, in some other embodiments the filter 440 comprises the adaptive loop filter and in yet some other embodiments the filter 440 comprises both the sample adaptive filter and the adaptive loop filter.

If the resolution of the base layer and the enhancement layer differ from each other, the filtered base layer sample values may need to be upsampled by the upsampler 450. The output of the upsampler 450 i.e. upsampled filtered base layer sample values are then provided to the enhancement layer encoding element 420 as a reference for prediction of pixel values for the current block on the enhancement layer.

For completeness a suitable decoder is hereafter described. However, some decoders may not be able to process enhancement layer data wherein they may not be able to decode all received images. The decoder may examine the received bit stream to determine the values of the two flags such as the inter_layer_pred_for_el_rap_only_flag and the single_layer_for_non_rap_flag. If the value of the first flag indicates that only random access pictures in the enhancement layer may utilize inter-layer prediction and that non-RAP pictures in the enhancement layer never utilize inter-layer prediction, the decoder may deduce that inter-layer prediction is only used with RAP pictures.

At the decoder side similar operations are performed to reconstruct the image blocks. FIG. 5a shows a block diagram of a video decoder suitable for employing embodiments of the invention. FIG. 5b shows a block diagram of a spatial scalability decoding apparatus 800 comprising a base layer decoding element 810 and an enhancement layer decoding element 820. The base layer decoding element 810 decodes the encoded base layer bitstream 802 to a base layer decoded video signal 818 and, respectively, the enhancement layer decoding element 820 decodes the encoded enhancement layer bitstream 804 to an enhancement layer decoded video signal 828. The spatial scalability decoding apparatus 800 may also comprise a filter 840 for filtering reconstructed base layer pixel values and an upsampler 850 for upsampling filtered reconstructed base layer pixel values.

The base layer decoding element 810 and the enhancement layer decoding element 820 may comprise similar elements with the encoder depicted in FIG. 4a or they may be different from each other. In other words, both the base layer decoding element 810 and the enhancement layer decoding element 820 may comprise all or some of the elements of the decoder shown in FIG. 5a. In some embodiments the same decoder circuitry may be used for implementing the operations of the base layer decoding element 810 and the enhancement layer decoding element 820 wherein the decoder is aware the layer it is currently decoding.

The decoder shows an entropy decoder 700 which performs an entropy decoding on the received signal. The entropy decoder thus performs the inverse operation to the entropy encoder 330 of the encoder described above. The entropy decoder 700 outputs the results of the entropy decoding to a prediction error decoder 702 and pixel predictor 704.

The pixel predictor 704 receives the output of the entropy decoder 700. The output of the entropy decoder 700 may include an indication on the prediction mode used in encoding the current block. A predictor selector 714 within the pixel predictor 704 may determine that the current block to be decoded is an enhancement layer block. Hence, the predictor selector 714 may select to use information from a corresponding block on another layer such as the base layer to filter the base layer prediction block while decoding the current enhancement layer block. An indication that the base layer prediction block has been filtered before using in the enhancement layer prediction by the encoder may have been received by the decoder wherein the reconstruction processor 791 may use the indication to provide the reconstructed base layer block values to the filter 840 and to determine which kind of filter has been used, e.g. the SAO filter and/or the adaptive loop filter, or there may be other ways to determine whether or not the modified decoding mode should be used.

The predictor selector may output a predicted representation of an image block 716 to a first combiner 713. The predicted representation of the image block 716 is used in conjunction with the reconstructed prediction error signal 712 to generate a preliminary reconstructed image 718. The preliminary reconstructed image 718 may be used in the predictor 714 or may be passed to a filter 720. The filter 720 applies a filtering which outputs a final reconstructed signal 722. The final reconstructed signal 722 may be stored in a reference frame memory 724, the reference frame memory 724 further being connected to the predictor 714 for prediction operations.

The prediction error decoder 702 receives the output of the entropy decoder 700. A dequantizer 792 of the prediction error decoder 702 may dequantize the output of the entropy decoder 700 and the inverse transform block 793 may perform an inverse transform operation to the dequantized signal output by the dequantizer 792. The output of the entropy decoder 700 may also indicate that prediction error signal is not to be applied and in this case the prediction error decoder produces an all zero output signal.

It is assumed that the decoder has decoded the corresponding base layer block from which information for the modification may be used by the decoder. The current block of pixels in the base layer corresponding to the enhancement layer block may be searched by the decoder or the decoder may receive and decode information from the bitstream indicative of the base block and/or which information of the base block to use in the modification process.

In some embodiments the base layer may be coded with another standard other than H.264/AVC or HEVC.

It may also be possible to use any enhancement layer post-processing modules used as the preprocessors for the base layer data, including the HEVC SAO and HEVC ALF post-filters. The enhancement layer post-processing modules could be modified when operating on base layer data. For example, certain modes could be disabled or certain new modes could be added.

Figure 1:
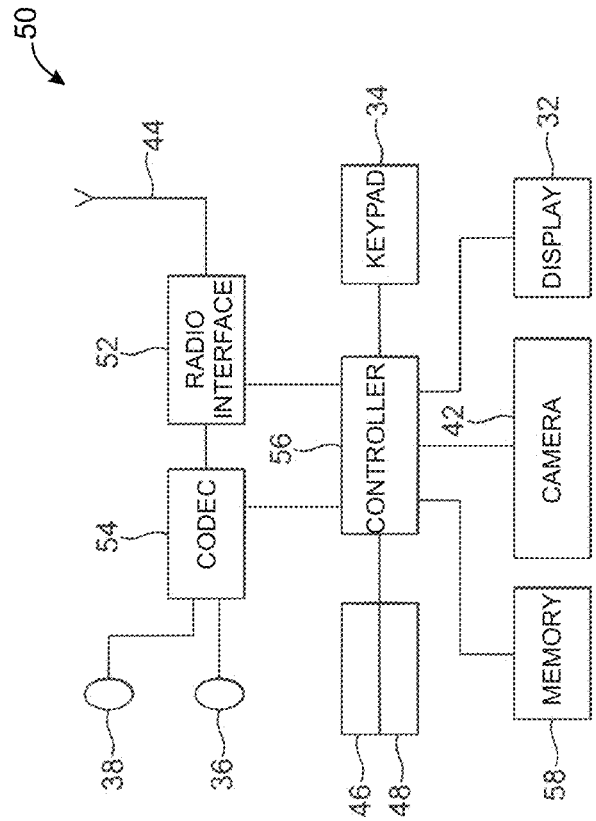
FIG. 1 shows schematically an electronic device employing some embodiments of the invention.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. In some embodiments the apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
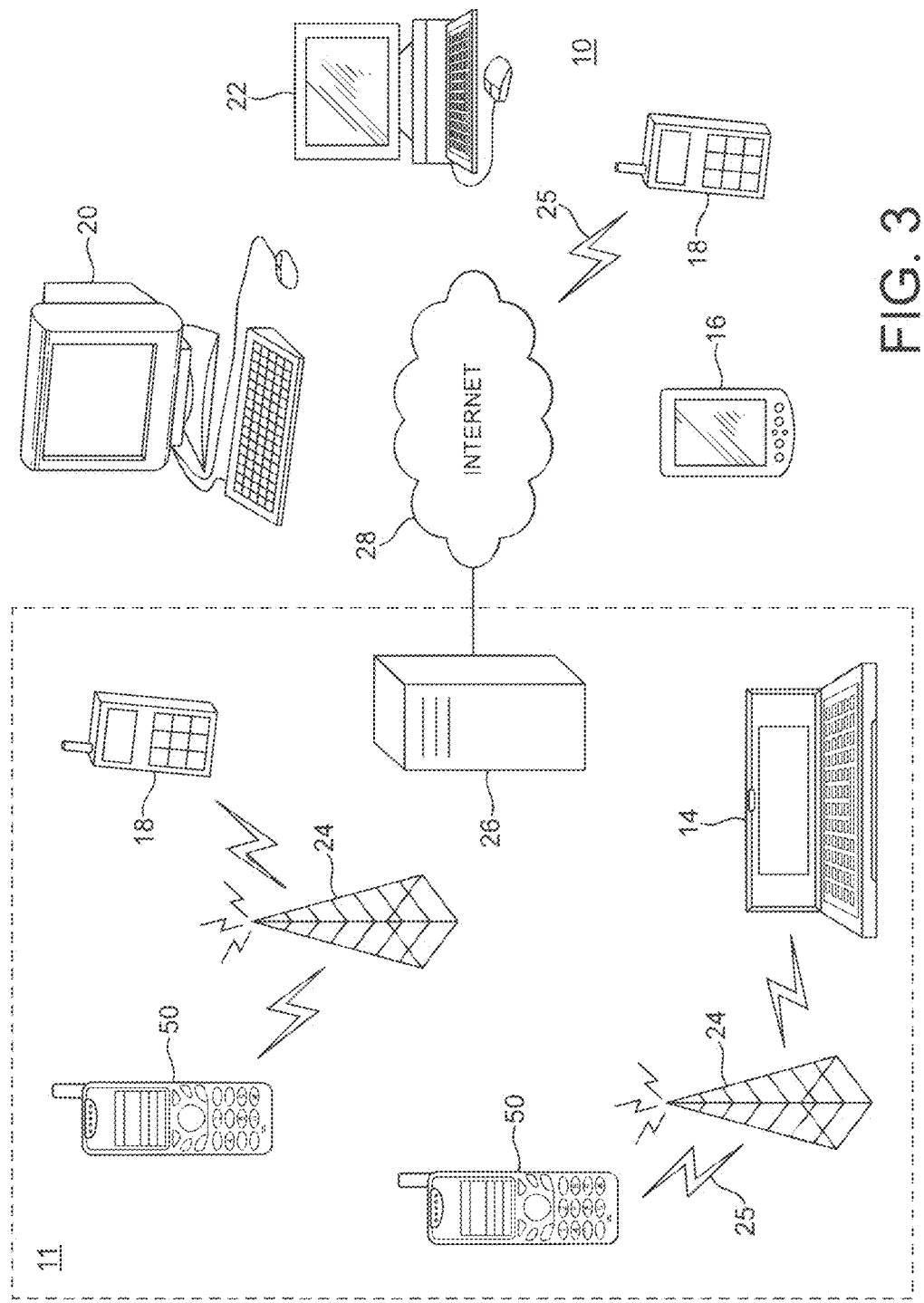
FIG. 3 further shows schematically electronic devices employing embodiments of the invention connected using wireless and/or wired network connections.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (MDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

As described above, an access unit may contain slices of different component types (e.g. primary texture component, redundant texture component, auxiliary component, depth/disparity component), of different views, and of different scalable layers. A component picture may be defined as a collective term for a dependency representation, a layer representation, a texture view component, a depth view component, a depth map, or anything like. Coded component pictures may be separated from each other using a component picture delimiter NAL unit, which may also carry common syntax element values to be used for decoding of the coded slices of the component picture. An access unit can consist of a relatively large number of component pictures, such as coded texture and depth view components as well as dependency and layer representations. The coded size of some component pictures may be relatively small for example because they can be considered to represent deltas relative to base view or base layer and because depth component pictures may be relatively easy to compress. When component picture delimiter NAL units are present in the bitstream, a component picture may be defined as a component picture delimiter NAL unit and the subsequent coded slice NAL units until the end of the access unit or until the next component picture delimiter NAL unit, exclusive, whichever is earlier in decoding order.

In the above, some embodiments have been described in relation to particular types of parameter sets. It needs to be understood, however, that embodiments could be realized with any type of parameter set or other syntax structure in the bitstream.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices. For example, in some embodiments, an indication according to any embodiment above may be coded into a video parameter set or a sequence parameter set, which is conveyed externally from a coded video sequence for example using a control protocol, such as SDP. Continuing the same example, a receiver may obtain the video parameter set or the sequence parameter set, for example using the control protocol, and provide the video parameter set or the sequence parameter set for decoding.

In the above, some embodiments have been described in relation to coding/decoding methods or tools having inter-component dependency. It needs to be understood that embodiments may not be specific to the described coding/decoding methods but could be realized with any similar coding/decoding methods or tools.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

In the above, some embodiments have been described with reference to an enhancement layer and a base layer. It needs to be understood that the base layer may as well be any other layer as long as it is a reference layer for the enhancement layer. It also needs to be understood that the encoder may generate more than two layers into a bitstream and the decoder may decode more than two layers from the bitstream. Embodiments could be realized with any pair of an enhancement layer and its reference layer. Likewise, many embodiments could be realized with consideration of more than two layers.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example, there is provided a method comprising:

encoding a first picture having a first resolution on a first layer without using inter-layer prediction;

encoding a second picture having a second resolution on a second layer using inter-layer prediction between the first layer and the second layer and without using temporal prediction using pictures from the second layer for providing a switching point from the first layer to the second layer;

encoding a third picture having the second resolution on the second layer without using inter-layer prediction and without temporally referencing to pictures prior to the second picture on the second layer; and encoding an indication that the first and third pictures are encoded without using inter-layer prediction and that the second picture is encoded using inter-layer prediction but without using temporal prediction.

In some embodiments the method comprises one or more of the following:

signaling the indication at a sequence level;

signaling the indication by a type of a unit at a network abstraction layer;

signaling the indication in a supplemental enhancement information network abstraction layer unit;

signaling the indication in a sequence parameter set.

In some embodiments the method comprises:

providing the indication as a first indicator and a second indicator.

In some embodiments the method comprises:

using the first indicator to indicate that a coded video sequence is constrained to perform the adaptive resolution change operation; and using the second indicator to indicate that, except for pictures at switching point, each access unit contains a single picture from a single layer; and that access units where switching happens include pictures from two layers and inter-layer scalability tools may be used.

In some embodiments the first indicator is an inter_layer_pred_for_el_rap_only_flag and the second indicator is a single_layer_for_non_rap_flag.

In some embodiments, the network abstraction layer unit type is used to indicate the switching point and to indicate that any picture following the picture indicated with the network abstraction layer unit type do not use inter-layer prediction and do not reference pictures prior to picture with indicated with network abstraction layer unit type.

In some embodiments the first layer is a base layer of a scalable video coding; and the second layer is an enhancement layer of the scalable video coding.

In some embodiments the first layer is a first enhancement layer of a scalable video coding; and the second layer is another enhancement layer of the scalable video coding.

In some embodiments the first layer is a first view of a multiview video coding; and the second layer is a second view of the multiview video coding.

In some embodiments the second picture is one of the following picture types:

an intra coded picture;

a picture without temporal prediction;

an anchor access unit;

a random access picture; or a stepwise random access picture.

In some embodiments the method comprises using the second picture for at least one of the following:
resolution change of a video presentation;
quality scalability;
bit-depth scalability;
spatial scalability;
chroma format scalability.

In some embodiments the method comprises:
receiving by a network element encoded pictures of the first layer and the second layer for at least one access unit of a video presentation; and
determining a format in which the video presentation is to be sent to a recipient;
wherein on the basis of the determination the method further comprises:
sending only one layer of the video presentation to the recipient; or
sending both the first layer and the second layer to the recipient.

According to a second example there is provided an apparatus comprising at least one processor and at least one memory including computer program code, the at least one memory and the computer program code configured to, with the at least one processor, cause the apparatus to:
encode a first picture having a first resolution on a first layer without using inter-layer prediction;
encode a second picture having a second resolution on a second layer using inter-layer prediction between the first layer and the second layer and without using temporal prediction using pictures from the second layer for providing a switching point from the first layer to the second layer;
encode a third picture having the second resolution on the second layer without using inter-layer prediction and without temporally referencing to pictures prior to the second picture on the second layer; and
encode an indication that the first and third pictures are encoded without using inter-layer prediction and that the second picture is encoded using inter-layer prediction but without using temporal prediction.

In some embodiments of the apparatus said at least one memory stored with code thereon, which when executed by said at least one processor, causes the apparatus to perform at least the following:
signal the indication at a sequence level;
signal the indication by a type of a unit at a network abstraction layer;
signal the indication in a supplemental enhancement information network abstraction layer unit;
signal the indication in a sequence parameter set.

In some embodiments of the apparatus said at least one memory stored with code thereon, which when executed by said at least one processor, causes the apparatus to perform at least the following:
provide the indication as a first indicator and a second indicator.

In some embodiments of the apparatus said at least one memory stored with code thereon, which when executed by said at least one processor, causes the apparatus to perform at least the following:
using the first indicator to indicate that a coded video sequence is constrained to perform the adaptive resolution change operation; and
using the second indicator to indicate that, except for switching pictures, each access unit contains a single picture from a single layer; and that access units where switching happens include pictures from two layers and inter-layer scalability tools may be used.

In some embodiments the first indicator is an inter_layer_pred_for_el_rap_only_flag and the second indicator is a single_layer_for_non_rap_flag.

In some embodiments, the network abstraction layer unit type is used to indicate the switching point and to indicate that any picture following the picture indicated with the network abstraction layer unit type do not use inter-layer prediction and do not reference pictures prior to picture with indicated with network abstraction layer unit type.

In some embodiments the first layer is a base layer of a scalable video coding; and the second layer is an enhancement layer of the scalable video coding.

In some embodiments the first layer is a first enhancement layer of a scalable video coding; and the second layer is another enhancement layer of the scalable video coding.

In some embodiments the first layer is a first view of a multiview video coding; and the second layer is a second view of the multiview video coding.

In some embodiments the second picture is one of the following picture types:
an intra coded picture;
a picture without temporal prediction;
an anchor access unit;
a random access picture; or
a stepwise random access picture.

In some embodiments of the apparatus said at least one memory stored with code thereon, which when executed by said at least one processor, causes the apparatus to use the second picture for at least one of the following:
resolution change of a video presentation;
quality scalability;
bit-depth scalability;
spatial scalability;
chroma format scalability.

In some embodiments of the apparatus said at least one memory stored with code thereon, which when executed by said at least one processor, causes the apparatus to perform at least the following:
receive by a network element encoded pictures of the first layer and the second layer for at least one access unit of a video presentation; and
determine a format in which the video presentation is to be sent to a recipient;
wherein on the basis of the determination said at least one memory stored with code thereon, which when executed by said at least one processor, further causes the apparatus to perform at least the following:
send only one layer of the video presentation to the recipient; or
send both the first layer and the second layer to the recipient.

According to a third example there is provided a computer program product embodied on a non-transitory computer readable medium, comprising computer program code configured to, when executed on at least one processor, cause an apparatus or a system to:
encode a first picture having a first resolution on a first layer without using inter-layer prediction;
encode a second picture having a second resolution on a second layer using inter-layer prediction between the first layer and the second layer and without using temporal prediction using pictures from the second layer for providing a switching point from the first resolution to the second resolution;
encode a third picture having the second resolution on the second layer without using inter-layer prediction and without temporally referencing to pictures prior to the second picture on the second layer; and encode an indication that the first and third pictures are encoded without using inter-layer prediction and that the second picture is encoded using inter-layer prediction but without using temporal prediction.

In some embodiments the computer program product comprises computer program code configured to, when executed by said at least one processor, causes the apparatus or the system to perform at least the following:
signal the indication at a sequence level;
signal the indication by a type of a unit at a network abstraction layer;
signal the indication in a supplemental enhancement information network abstraction layer unit;
signal the indication in a sequence parameter set.

In some embodiments the computer program product comprises computer program code configured to, when executed by said at least one processor, causes the apparatus or the system to perform at least the following:
provide the indication as a first indicator and a second indicator.

In some embodiments the computer program product comprises computer program code configured to, when executed by said at least one processor, causes the apparatus or the system to perform at least the following:
using the first indicator to indicate that a coded video sequence is constrained to perform the adaptive resolution change operation; and
using the second indicator to indicate that, except for switching pictures, each access unit contains a single picture from a single layer; and that access units where switching happens include pictures from two layers and inter-layer scalability tools may be used.

In some embodiments the first indicator is an inter_layer_pred_for_el_rap_only_flag and the second indicator is a single_layer_for_non_rap_flag.

In some embodiments, the network abstraction layer unit type is used to indicate the switching point and to indicate that any picture following the picture indicated with the network abstraction layer unit type do not use inter-layer prediction and do not reference pictures prior to picture with indicated with network abstraction layer unit type.

In some embodiments the first layer is a base layer of a scalable video coding; and the second layer is an enhancement layer of the scalable video coding.

In some embodiments the first layer is a first enhancement layer of a scalable video coding; and the second layer is another enhancement layer of the scalable video coding.

In some embodiments the first layer is a first view of a multiview video coding; and the second layer is a second view of the multiview video coding.

In some embodiments the second picture is one of the following picture types:
an intra coded picture;
a picture without temporal prediction;
an anchor access unit;
a random access picture; or
a stepwise random access picture.

In some embodiments the computer program product comprises computer program code configured to, when executed by said at least one processor, causes the apparatus or the system to use the second picture for at least one of the following:
resolution change of a video presentation;
quality scalability;
bit-depth scalability;
spatial scalability;
chroma format scalability.

In some embodiments the computer program product comprises computer program code configured to, when executed by said at least one processor, causes the apparatus or the system to perform at least the following:
receive by a network element encoded pictures of the first layer and the second layer for at least one access unit of a video presentation; and
determine a format in which the video presentation is to be sent to a recipient;
wherein on the basis of the determination said at least one memory stored with code thereon, which when executed by said at least one processor, further causes the apparatus or the system to perform at least the following:
send only one layer of the video presentation to the recipient; or
send both the first layer and the second layer to the recipient.

According to a fourth example there is provided an apparatus comprising:
means for encoding a first picture having a first resolution on a first layer without using inter-layer prediction;
means for encoding a second picture having a second resolution on a second layer using inter-layer prediction between the first layer and the second layer and without using temporal prediction using pictures from the second layer for providing a switching point from the first layer to the second layer;
means for encoding a third picture having the second resolution on the second layer without using inter-layer prediction and without temporally referencing to pictures prior to the second picture on the second layer; and
means for encoding an indication that the first and third pictures are encoded without using inter-layer prediction and that the second picture is encoded using inter-layer prediction but without using temporal prediction.

According to a fifth example there is provided a method comprising:
receiving one or more indications to determine if a switching point from a first layer to a second layer exists in a bit stream, wherein if the switching point exists and if the switching point refers to a picture coded using inter-layer prediction, the method further comprises:
decoding one or more pictures in the first layer prior to the switching point;
decoding one or more pictures associated with the switching point; and
decoding one or more pictures in the second layer after the switching point.

In some embodiments the method comprises one or more of the following:
receiving the one or more indications at a sequence level;
receiving the one or more indications as a type of a unit at a network abstraction layer;
receiving the one or more indications in a supplemental enhancement information network abstraction layer unit;
receiving the one or more indications in a sequence parameter set.

In some embodiments the method comprises:
receiving the indication as a first indicator and a second indicator.

In some embodiments the method comprises:
using the first indicator to determine whether a coded video sequence is constrained to perform the adaptive resolution change operation; and using the second indicator to determine whether, except for switching pictures, each access unit contains a single picture from a single layer; and whether access units where switching happens include pictures from two layers and inter-layer scalability tools may be used.

In some embodiments the first indicator is an inter_layer_pred_for_el_rap_only_flag and the second indicator is a single_layer_for_non_rap_flag.

In some embodiments, the network abstraction layer unit type is used to indicate the switching point and to indicate that any picture following the picture indicated with the network abstraction layer unit type do not use inter-layer prediction and do not reference pictures prior to picture with indicated with network abstraction layer unit type.

In some embodiments the first layer is a base layer of a scalable video coding; and the second layer is an enhancement layer of the scalable video coding.

In some embodiments the first layer is a first enhancement layer of a scalable video coding; and the second layer is another enhancement layer of the scalable video coding.

In some embodiments the first layer is a first view of a multiview video coding; and the second layer is a second view of the multiview video coding.

In some embodiments the second picture is one of the following picture types:
  an intra coded picture;
  a picture without temporal prediction;
  an anchor access unit;
  a random access picture; or
  a stepwise random access picture.

In some embodiments the method comprises using the second picture for at least one of the following:
  resolution change of a video presentation;
  quality scalability;
  bit-depth scalability;
  spatial scalability;
  chroma format scalability.

According to a sixth example there is provided an apparatus comprising at least one processor and at least one memory including computer program code, the at least one memory and the computer program code configured to, with the at least one processor, cause the apparatus to:
  receive one or more indications to determine if a switching point from a first layer to a second layer exists in a bit stream, wherein said at least one memory stored with code thereon, which when executed by said at least one processor, causes the apparatus to perform at least the following, if the switching point exists and if the switching point refers to a picture coded using inter-layer prediction:
  decode one or more pictures in the first layer prior to the switching point;
  decode one or more pictures associated with the switching point; and
  decode one or more pictures in the second layer after the switching point.

In some embodiments of the apparatus said at least one memory stored with code thereon, which when executed by said at least one processor, causes the apparatus to perform at least the following:
  receive the one or more indications at a sequence level;
  receive the one or more indications as a type of a unit at a network abstraction layer;
  receive the one or more indications in a supplemental enhancement information network abstraction layer unit;
  receive the one or more indications in a sequence parameter set.

In some embodiments of the apparatus said at least one memory stored with code thereon, which when executed by said at least one processor, causes the apparatus to perform at least the following:
  receive the indication as a first indicator and a second indicator.

In some embodiments of the apparatus said at least one memory stored with code thereon, which when executed by said at least one processor, causes the apparatus to perform at least the following:
  use the first indicator to determine whether a coded video sequence is constrained to perform the adaptive resolution change operation; and
  use the second indicator to determine whether, except for switching pictures, each access unit contains a single picture from a single layer; and whether access units where switching happens include pictures from two layers and inter-layer scalability tools may be used.

In some embodiments the first indicator is an inter_layer_pred_for_el_rap_only_flag and the second indicator is a single_layer_for_non_rap_flag.

In some embodiments, the network abstraction layer unit type is used to indicate the switching point and to indicate that any picture following the picture indicated with the network abstraction layer unit type do not use inter-layer prediction and do not reference pictures prior to picture with indicated with network abstraction layer unit type.

In some embodiments the first layer is a base layer of a scalable video coding; and the second layer is an enhancement layer of the scalable video coding.

In some embodiments the first layer is a first enhancement layer of a scalable video coding; and the second layer is another enhancement layer of the scalable video coding.

In some embodiments the first layer is a first view of a multiview video coding; and the second layer is a second view of the multiview video coding.

In some embodiments the second picture is one of the following picture types:
  an intra coded picture;
  a picture without temporal prediction;
  an anchor access unit;
  a random access picture; or
  a stepwise random access picture.

In some embodiments of the apparatus said at least one memory stored with code thereon, which when executed by said at least one processor, causes the apparatus to use the second picture for at least one of the following:
  resolution change of a video presentation;
  quality scalability;
  bit-depth scalability;
  spatial scalability;
  chroma format scalability.

According to a seventh example there is provided a computer program product embodied on a non-transitory computer readable medium, comprising computer program code configured to, when executed on at least one processor, cause an apparatus or a system to:
  receive one or more indications to determine if a switching point from a first layer to a second layer exists in a bit stream, wherein said at least one memory stored with code thereon, which when executed by said at least one processor, causes the apparatus to perform at least the following, if the switching point exists and if the switching point refers to a picture coded using inter-layer prediction:
  decode one or more pictures in the first layer prior to the switching point;

decode one or more pictures associated with the switching point; and decode one or more pictures in the second layer after the switching point.

In some embodiments the computer program product comprises computer program code configured to, when executed by said at least one processor, causes the apparatus or the system to perform at least the following:

receive the one or more indications at a sequence level;

receive the one or more indications as a type of a unit at a network abstraction layer;

receive the one or more indications in a supplemental enhancement information network abstraction layer unit;

receive the one or more indications in a sequence parameter set.

In some embodiments the computer program product comprises computer program code configured to, when executed by said at least one processor, causes the apparatus or the system to perform at least the following:

receive the indication as a first indicator and a second indicator.

In some embodiments the computer program product comprises computer program code configured to, when executed by said at least one processor, causes the apparatus or the system to perform at least the following:

use the first indicator to determine whether a coded video sequence is constrained to perform the adaptive resolution change operation; and use the second indicator to determine whether, except for switching pictures, each access unit contains a single picture from a single layer; and whether access units where switching happens include pictures from two layers and inter-layer scalability tools may be used.

In some embodiments the first indicator is an inter_layer_pred_for_el_rap_only_flag and the second indicator is a single_layer_for_non_rap_flag.

In some embodiments, the network abstraction layer unit type is used to indicate the switching point and to indicate that any picture following the picture indicated with the network abstraction layer unit type do not use inter-layer prediction and do not reference pictures prior to picture with indicated with network abstraction layer unit type.

In some embodiments the first layer is a base layer of a scalable video coding; and the second layer is an enhancement layer of the scalable video coding.

In some embodiments the first layer is a first enhancement layer of a scalable video coding; and the second layer is another enhancement layer of the scalable video coding.

In some embodiments the first layer is a first view of a multiview video coding; and the second layer is a second view of the multiview video coding.

In some embodiments the second picture is one of the following picture types:

an intra coded picture;

a picture without temporal prediction;

an anchor access unit;

a random access picture; or a stepwise random access picture.

In some embodiments the computer program product comprises computer program code configured to, when executed by said at least one processor, causes the apparatus or the system to use the second picture for at least one of the following:

resolution change of a video presentation;

quality scalability;

bit-depth scalability;

spatial scalability;

chroma format scalability.

According to an eighth example there is provided an apparatus comprising:

means for receiving one or more indications to determine if a switching point from a first layer to a second layer exists in a bit stream;

means for decoding one or more pictures in the first layer prior to the switching point, for decoding one or more pictures associated with the switching point, and for decoding one or more pictures in the second layer after the switching point, if the switching point exists and if the switching point refers to a picture coded using inter-layer prediction.

According to a ninth example, there is provided a method comprising:

encoding a first set of pictures having a first resolution into a first representation;

encoding a second set of pictures into a second representation using inter prediction from the first set of pictures and without using temporal prediction for providing a switching point from the first resolution to a second resolution;

encoding a third set of pictures having the second resolution into a third representation without using inter-layer prediction and without temporally referencing to pictures prior to the second set of pictures of the second representation; and encoding an indication that the first and third set of pictures are encoded without using inter-layer prediction and that at least one picture of the second set of pictures is encoded using inter-layer prediction but without using temporal prediction.

In some embodiments the method comprises:

encoding the first representation, the second representation and the third representation into an adaptation set.

In some embodiments the method comprises:

storing the adaptation set into a file; and providing a media presentation description of the contents of the file.

In some embodiments the method comprises one or more of the following:

signaling the indication at a sequence level;

signaling the indication by a type of a unit at a network abstraction layer;

signaling the indication in a supplemental enhancement information network abstraction layer unit;

signaling the indication in a sequence parameter set.

In some embodiments the method comprises:

providing the indication as a first indicator and a second indicator.

In some embodiments the method comprises:

using the first indicator to indicate that a coded video sequence is constrained to perform the adaptive resolution change operation; and using the second indicator to indicate that, except for pictures at switching point, each access unit contains a single picture from a single layer; and that access units where switching happens include pictures from two layers and inter-layer scalability tools may be used.

In some embodiments of the method the first indicator is an inter_layer_pred_for_el_rap_only_flag and the second indicator is a single_layer_for_non_irap_flag.

In some embodiments the method comprises:

receiving a request to send the second representation.

In some embodiments the method comprises:

receiving a request to send a media presentation description of a presentation comprising the sets of pictures.

In some embodiments the method comprises transmitting the segments using one or more of the following:
dynamic adaptive streaming over HTTP;
an email;
a thumb drive;
broadcast.

According to a tenth example, there is provided an apparatus comprising at least one processor and at least one memory including computer program code, the at least one memory and the computer program code configured to, with the at least one processor, cause the apparatus to:

encode a first set of pictures having a first resolution into a first representation;

encode a second set of pictures into a second representation using inter prediction from the first set of pictures and without using temporal prediction for providing a switching point from the first resolution to a second resolution;

encode a third set of pictures having the second resolution into a third representation without using inter-layer prediction and without temporally referencing to pictures prior to the second set of pictures of the second representation; and encode an indication that the first and third set of pictures are encoded without using inter-layer prediction and that at least one picture of the second set of pictures is encoded using inter-layer prediction but without using temporal prediction.

In some embodiments of the apparatus said at least one memory stored with code thereon, which when executed by said at least one processor, causes the apparatus to perform at least the following:
encode the first representation, the second representation and the third representation into an adaptation set.

In some embodiments of the apparatus said at least one memory stored with code thereon, which when executed by said at least one processor, causes the apparatus to perform at least the following:
store the adaptation set into a file; and
provide a media presentation description of the contents of the file.

In some embodiments of the apparatus said at least one memory stored with code thereon, which when executed by said at least one processor, causes the apparatus to perform at least the following:
signal the indication at a sequence level;
signal the indication by a type of a unit at a network abstraction layer;
signal the indication in a supplemental enhancement information network abstraction layer unit;
signal the indication in a sequence parameter set.

In some embodiments of the apparatus said at least one memory stored with code thereon, which when executed by said at least one processor, causes the apparatus to perform at least the following:
provide the indication as a first indicator and a second indicator.

In some embodiments of the apparatus said at least one memory stored with code thereon, which when executed by said at least one processor, causes the apparatus to perform at least the following:
use the first indicator to indicate that a coded video sequence is constrained to perform the adaptive resolution change operation; and
use the second indicator to indicate that, except for pictures at switching point, each access unit contains a single picture from a single layer; and that access units where switching happens include pictures from two layers and inter-layer scalability tools may be used.

In some embodiments of the apparatus the first indicator is an inter_layer_pred_for_el_rap_only_flag and the second indicator is a single_layer_for_non_irap_flag.

In some embodiments of the apparatus said at least one memory stored with code thereon, which when executed by said at least one processor, causes the apparatus to perform at least the following:
receive a request to send the second representation.

In some embodiments of the apparatus said at least one memory stored with code thereon, which when executed by said at least one processor, causes the apparatus to perform at least the following:
receive a request to send a media presentation description of a presentation comprising the sets of pictures.

In some embodiments of the apparatus said at least one memory stored with code thereon, which when executed by said at least one processor, causes the apparatus to transmit the segments using one or more of the following:
dynamic adaptive streaming over HTTP;
an email;
a thumb drive;
broadcast.

According to an eleventh example, there is provided a computer program product embodied on a non-transitory computer readable medium, comprising computer program code configured to, when executed on at least one processor, cause an apparatus or a system to:

encode a first set of pictures having a first resolution into a first representation;

encode a second set of pictures into a second representation using inter prediction from the first set of pictures and without using temporal prediction for providing a switching point from the first resolution to a second resolution;

encode a third set of pictures having the second resolution into a third representation without using inter-layer prediction and without temporally referencing to pictures prior to the second set of pictures of the second representation; and encode an indication that the first and third set of pictures are encoded without using inter-layer prediction and that at least one picture of the second set of pictures is encoded using inter-layer prediction but without using temporal prediction.

In some embodiments the computer program product comprises computer program code configured to, when executed by said at least one processor, causes the apparatus or the system to perform at least the following:
encode the first representation, the second representation and the third representation into an adaptation set.

In some embodiments the computer program product comprises computer program code configured to, when executed by said at least one processor, causes the apparatus or the system to perform at least the following:
store the adaptation set into a file; and
provide a media presentation description of the contents of the file.

In some embodiments the computer program product comprises computer program code configured to, when executed by said at least one processor, causes the apparatus or the system to perform at least the following:
signal the indication at a sequence level;
signal the indication by a type of a unit at a network abstraction layer;
signal the indication in a supplemental enhancement information network abstraction layer unit;
signal the indication in a sequence parameter set.

In some embodiments the computer program product comprises computer program code configured to, when executed by said at least one processor, causes the apparatus or the system to perform at least the following:

provide the indication as a first indicator and a second indicator.

In some embodiments the computer program product comprises computer program code configured to, when executed by said at least one processor, causes the apparatus or the system to perform at least the following:

use the first indicator to indicate that a coded video sequence is constrained to perform the adaptive resolution change operation; and use the second indicator to indicate that, except for pictures at switching point, each access unit contains a single picture from a single layer; and that access units where switching happens include pictures from two layers and inter-layer scalability tools may be used.

In some embodiments of the computer program product the first indicator is an inter_layer_pred_for_el_rap_only_flag and the second indicator is a single_layer_for_non_irap_flag.

In some embodiments the computer program product comprises computer program code configured to, when executed by said at least one processor, causes the apparatus or the system to perform at least the following:

receive a request to send the second representation.

In some embodiments the computer program product comprises computer program code configured to, when executed by said at least one processor, causes the apparatus or the system to perform at least the following:

receive a request to send a media presentation description of a presentation comprising the sets of pictures.

In some embodiments the computer program product comprises computer program code configured to, when executed by said at least one processor, causes the apparatus or the system to transmit the segments using one or more of the following:

dynamic adaptive streaming over HTTP;

an email;

a thumb drive; broadcast.

According to a twelfth example, there is provided a method comprising:

decoding an indication that a first and third set of pictures are encoded without using inter-layer prediction and that at least one picture of a second set of pictures is encoded using inter-layer prediction but without using temporal prediction;

decoding the first set of pictures having a first resolution into a first representation;

decoding the second set of pictures from a second representation using inter prediction from the first set of pictures and without using temporal prediction for providing a switching point from the first resolution to a second resolution; and decoding the third set of pictures having the second resolution from a third representation without using inter-layer prediction and without temporally referencing to pictures prior to the second set of pictures of the second representation.

In some embodiments the method comprises:

decoding the first representation, the second representation and the third representation from an adaptation set.

In some embodiments the method comprises:

receiving the adaptation set as a file; and receiving a media presentation description of the contents of the file.

In some embodiments the method comprises one or more of the following:

receiving the indication at a sequence level;

receiving the indication by a type of a unit at a network abstraction layer;

receiving the indication in a supplemental enhancement information network abstraction layer unit;

receiving the indication in a sequence parameter set.

In some embodiments the method comprises:

receiving the indication as a first indicator and a second indicator.

In some embodiments the method comprises:

using the first indicator to determine that a coded video sequence is constrained to perform the adaptive resolution change operation; and using the second indicator to determine that, except for pictures at switching point, each access unit contains a single picture from a single layer; and that access units where switching happens include pictures from two layers and inter-layer scalability tools may be used.

In some embodiments of the method the first indicator is an inter_layer_pred_for_el_rap_only_flag and the second indicator is a single_layer_for_non_irap_flag.

In some embodiments the method comprises:

sending a request to send the second representation.

In some embodiments the method comprises:

sending a request to send a media presentation description of a presentation comprising the sets of pictures.

In some embodiments the method comprises receiving the segments using one or more of the following:

dynamic adaptive streaming over HTTP;

an email;

a thumb drive;

broadcast.

According to a thirteenth example, there is provided an apparatus comprising at least one processor and at least one memory including computer program code, the at least one memory and the computer program code configured to, with the at least one processor, cause the apparatus to:

decode an indication that a first and third set of pictures are encoded without using inter-layer prediction and that at least one picture of a second set of pictures is encoded using inter-layer prediction but without using temporal prediction;

decode the first set of pictures having a first resolution into a first representation;

decode the second set of pictures from a second representation using inter prediction from the first set of pictures and without using temporal prediction for providing a switching point from the first resolution to a second resolution; and decode the third set of pictures having the second resolution from a third representation without using inter-layer prediction and without temporally referencing to pictures prior to the second set of pictures of the second representation.

In some embodiments of the apparatus said at least one memory stored with code thereon, which when executed by said at least one processor, causes the apparatus to perform at least the following:

decode the first representation, the second representation and the third representation from an adaptation set.

In some embodiments of the apparatus said at least one memory stored with code thereon, which when executed by said at least one processor, causes the apparatus to perform at least the following:

receive the adaptation set as a file; and receive a media presentation description of the contents of the file.

In some embodiments of the apparatus said at least one memory stored with code thereon, which when executed by said at least one processor, causes the apparatus to perform at least the following:
  receive the indication at a sequence level;
  receive the indication by a type of a unit at a network abstraction layer;
  receive the indication in a supplemental enhancement information network abstraction layer unit;
  receive the indication in a sequence parameter set.

In some embodiments of the apparatus said at least one memory stored with code thereon, which when executed by said at least one processor, causes the apparatus to perform at least the following:
  receive the indication as a first indicator and a second indicator.

In some embodiments of the apparatus said at least one memory stored with code thereon, which when executed by said at least one processor, causes the apparatus to perform at least the following:
  use the first indicator to determine that a coded video sequence is constrained to perform the adaptive resolution change operation; and
  use the second indicator to determine that, except for pictures at switching point, each access unit contains a single picture from a single layer; and that access units where switching happens include pictures from two layers and inter-layer scalability tools may be used.

In some embodiments of the apparatus the first indicator is an inter_layer_pred_for_el_rap_only_flag and the second indicator is a single_layer_for_non_irap_flag.

In some embodiments of the apparatus said at least one memory stored with code thereon, which when executed by said at least one processor, causes the apparatus to perform at least the following:
  send a request to send the second representation.

In some embodiments of the apparatus said at least one memory stored with code thereon, which when executed by said at least one processor, causes the apparatus to perform at least the following:
  send a request to send a media presentation description of a presentation comprising the sets of pictures.

In some embodiments of the apparatus said at least one memory stored with code thereon, which when executed by said at least one processor, causes the apparatus to receive the segments using one or more of the following:
  dynamic adaptive streaming over HTTP;
  an email;
  a thumb drive; broadcast.

According to a fourteenth example, there is provided a computer program product embodied on a non-transitory computer readable medium, comprising computer program code configured to, when executed on at least one processor, cause an apparatus or a system to:
  decode an indication that a first and third set of pictures are encoded without using inter-layer prediction and that at least one picture of a second set of pictures is encoded using inter-layer prediction but without using temporal prediction;
  decode the first set of pictures having a first resolution into a first representation;
  decode the second set of pictures from a second representation using inter prediction from the first set of pictures and without using temporal prediction for providing a switching point from the first resolution to a second resolution; and
  decode the third set of pictures having the second resolution from a third representation without using inter-layer prediction and without temporally referencing to pictures prior to the second set of pictures of the second representation.

In some embodiments the computer program product comprises computer program code configured to, when executed by said at least one processor, causes the apparatus or the system to perform at least the following:
  decode the first representation, the second representation and the third representation from an adaptation set.

In some embodiments the computer program product comprises computer program code configured to, when executed by said at least one processor, causes the apparatus or the system to perform at least the following:
  receive the adaptation set as a file; and
  receive a media presentation description of the contents of the file.

In some embodiments the computer program product comprises computer program code configured to, when executed by said at least one processor, causes the apparatus or the system to perform at least the following:
  receive the indication at a sequence level;
  receive the indication by a type of a unit at a network abstraction layer;
  receive the indication in a supplemental enhancement information network abstraction layer unit;
  receive the indication in a sequence parameter set.

In some embodiments of the apparatus said at least one memory stored with code thereon, which when executed by said at least one processor, causes the apparatus to perform at least the following:
  receive the indication as a first indicator and a second indicator.

In some embodiments the computer program product comprises computer program code configured to, when executed by said at least one processor, causes the apparatus or the system to perform at least the following:
  use the first indicator to determine that a coded video sequence is constrained to perform the adaptive resolution change operation; and use the second indicator to determine that, except for pictures at switching point, each access unit contains a single picture from a single layer; and that access units where switching happens include pictures from two layers and inter-layer scalability tools may be used.

In some embodiments of the computer program product the first indicator is an inter_layer_pred_for_el_rap_only_flag and the second indicator is a single_layer_for_non_irap_flag.

In some embodiments the computer program product comprises computer program code configured to, when executed by said at least one processor, causes the apparatus or the system to perform at least the following:
  send a request to send the second representation.

In some embodiments the computer program product comprises computer program code configured to, when executed by said at least one processor, causes the apparatus or the system to perform at least the following:
  send a request to send a media presentation description of a presentation comprising the sets of pictures.

In some embodiments the computer program product comprises computer program code configured to, when executed by said at least one processor, causes the apparatus or the system to receive the segments using one or more of the following:
  dynamic adaptive streaming over HTTP;
  an email;
  a thumb drive;
  broadcast.

We claim:

1. A method comprising:
receiving a first indicator and a second indicator, wherein a single value of the first indicator indicates that only random access pictures (RAP) in an enhancement layer utilize inter-layer prediction and also concurrently indicates that non-RAP pictures do not utilize inter-layer prediction, and wherein the second indicator indicates that other than an access unit associated with a switching point which includes pictures from at least two layers, every other access unit includes only pictures from a single layer;
determining by using at least one of the first indicator and the second indicator if the switching point from a first layer to a second layer exists in a bit stream, the switching point referring to a picture coded using inter-layer prediction; and
if the determining indicates that such switching point exists,
decoding one or more pictures in the first layer prior to the switching point;
decoding one or more pictures associated with the switching point; and
decoding one or more pictures in the second layer after the switching point.

2. The method according to claim 1 comprising one or more of the following:
receiving the first indicator and the second indicator at a sequence level;
receiving the first indicator and the second indicator as a type of a unit at a network abstraction layer;
receiving the first indicator and the second indicator in a supplemental enhancement
information network abstraction layer unit; and
receiving the first indicator and the second indicator in a sequence parameter set.

3. The method according to claim 1 comprising:
using the first indicator to determine whether a coded video sequence is constrained to perform the adaptive resolution change operation; and using the second indicator to determine whether inter-layer scalability tools may be used.

4. The method according to claim 1 comprising one of the following:
the first layer is a base layer of a scalable video coding; and the second layer is an enhancement layer of the scalable video coding; and
the first layer is a first enhancement layer of a scalable video coding; and the second layer is another enhancement layer of the scalable video coding; and
the first layer is a first view of a multiview video coding; and the second layer is a second view of the multiview video coding.

5. The method according to claim 1 comprising using the second picture for at least one of the following: resolution change of a video presentation; quality scalability; bit-depth scalability; spatial scalability; and chroma format scalability.

6. An apparatus comprising at least one processor and at least one non-transitory computer-readable memory including computer
program code, the at least one non-transitory computer-readable memory and the computer program code configured to, with the at least one processor, cause the apparatus to:
receive a first indicator and a second indicator, wherein a single value of the first indicator indicates that only random access pictures (RAP) in an enhancement layer utilize inter-layer prediction and also concurrently indicates that non-RAP pictures do not utilize inter-layer prediction, and wherein the second indicator indicates that other than an access unit associated with a switching point which includes pictures from at least two layers, every other access unit includes only pictures from a single layer;
determine by using at least one of the first indicator and the second indicator if the switching point from a first layer to a second layer exists in a bit stream; and
if the determining indicates that such switching point exists,
decode one or more pictures in the first layer prior to the switching point;
decode one or more pictures associated with the switching point; and
decode one or more pictures in the second layer after the switching point.

7. The apparatus according to claim 6, said at least one non-transitory computer-readable memory stored with code thereon, which when executed by said at least one processor, causes the apparatus to perform at least the following:
receive the first indicator and the second indicator at a sequence level;
receive the first indicator and the second indicator as a type of a unit at a network abstraction layer; and
receive the first indicator and the second indicator in a supplemental enhancement information network abstraction layer unit; and
receive the first indicator and the second indicator in a sequence parameter set.

8. The apparatus according to claim 7, said at least one non-transitory computer-readable memory stored with code thereon, which when executed by said at least one processor, causes the apparatus to perform at least the following:
use the first indicator to determine whether a coded video sequence is constrained to perform the adaptive resolution change operation; and
use the second indicator to determine whether inter-layer scalability tools may be used.

9. The apparatus according to claim 6, said at least one non-transitory computer-readable memory stored with code thereon, which when executed by said at least one processor, causes the apparatus to use the second picture for at least one of the following:
resolution change of a video presentation;
quality scalability;
bit depth scalability;
spatial scalability; and
chroma format scalability.

10. A method comprising:
encoding a first picture according to a first picture type having a first resolution bitstream on a first layer without using inter-layer prediction;
encoding a second picture according to a second picture type having a second resolution bitstream on a second layer using inter-layer prediction between the first layer and the second layer and without using temporal prediction using pictures from the second layer for providing a switching point from the first layer to the second layer;
encoding a third picture according to a third picture type having the second resolution bitstream on the second layer without using inter-layer prediction and without temporally referencing to pictures prior to the second picture on the second layer; and encoding a first indicator and a second indicator, wherein a single value of the first indicator provides an indication that non-access random access pictures (RAP) including the first and third picture types are encoded without using inter-layer prediction and also concurrently provides an indication that only RAP pictures including the second picture type are encoded using inter-layer prediction but without using temporal prediction, and wherein the second indicator provides an indication that other than an access unit associated with a switching point which includes pictures from at least two layers, every other access unit includes only pictures from a single layer.

11. The method according to claim 10 comprising one or more of the following:
  signaling the first indicator and the second indicator at a sequence level;
  signaling the first indicator and the second indicator by a type of a unit at a network abstraction layer;
  signaling the first indicator and the second indicator in a supplemental enhancement information network abstraction layer unit;
  signaling the first indicator and the second indicator in a sequence parameter set; or
  signaling the first indicator and the second indicator in a video parameter set.

12. The method according to claim 10, wherein the first indicator is further indicative of that all access units are selected from a group consisting of:
  a picture of the first picture type;
  a picture of the second picture type;
  a picture of the third picture type; and
  a picture of the first picture type and a picture of the second picture type.

13. The method according to claim 10 comprising one of the following:
  the first layer is a base layer of a scalable video coding; and the second layer is an enhancement layer of the scalable video coding;
  the first layer is a first enhancement layer of a scalable video coding; and the second layer is another enhancement layer of the scalable video coding; and
  the first layer is a first view of a multiview video coding; and the second layer is a second view of the multiview video coding.

14. The method according to claim 10 comprising using the second picture for at least one of the following:
  resolution change of a video presentation;
  quality scalability;
  bit-depth scalability;
  spatial scalability; and
  chroma format scalability.

15. An apparatus comprising at least one processor and at least one non-transitory computer-readable memory including computer program code, the at least one non-transitory computer-readable memory and the computer program code configured to, with the at least one processor, cause the apparatus to:
  encode a first picture according to a first picture type having a first resolution bitstream on a first layer without using inter-layer prediction;
  encode a second picture according to a second picture type having a second resolution bitstream on a second layer using inter-layer prediction between the first layer and the second layer and without using temporal prediction using pictures from the second layer for providing a switching point from the first layer to the second layer;
  encode a third picture according to a third picture type having the second resolution bitstream on the second layer without using inter-layer prediction and without temporally referencing to pictures prior to the second picture on the second layer; and
  encode a first indicator and a second indicator, wherein a single value of the first indicator provides an indication that non-access random access pictures (RAP) including the first and third picture types are encoded without using inter-layer prediction and also concurrently provides an indication that only RAP pictures including the second picture type are encoded using inter-layer prediction but without using temporal prediction, and wherein the second indicator provides an indication that other than an access unit associated with a switching point which includes pictures from at least two layers, every other access unit includes only pictures from a single layer.

16. The apparatus according to claim 15, said at least one non-transitory computer-readable memory stored with code thereon, which when executed by said at least one processor, causes the apparatus to perform at least the following:
  signal the first indicator and the second indicator at a sequence level;
  signal the first indicator and the second indicator by a type of a unit at a network abstraction layer;
  signal the first indicator and the second indicator in a supplemental enhancement information network abstraction layer unit;
  signal the first indicator and the second indicator in a sequence parameter set; or
  signaling the first indicator and the second indicator in a video parameter set.

17. The apparatus according to claim 15, wherein the first indicator is further indicative of that all access units within a scope of the indication consist of:
  a picture of the first picture type;
  a picture of the second picture type;
  a picture of the third picture type; or
  a picture of the first picture type and a picture of the second picture type.

18. The apparatus according to claim 15, said at least one non-transitory computer-readable memory stored with code thereon, which when executed by said at least one processor, causes the apparatus to perform at least the following:
  receive by a network element encoded pictures of the first layer and the second layer for at least one access unit of a video presentation; and
  determine a format in which the video presentation is to be sent to a recipient;
  wherein on the basis of the determination said at least one non-transitory computer-readable memory stored with code thereon, which when executed by said at least one processor, further causes the apparatus to perform at least the following:
  send only one layer of the video presentation to the recipient; or
  send both the first layer and the second layer to the recipient.

* * * * *